United States Patent
Otaka

(10) Patent No.: US 10,645,314 B2
(45) Date of Patent: May 5, 2020

(54) SOLID-STATE IMAGING DEVICE, METHOD FOR DRIVING SOLID-STATE IMAGING DEVICE, AND ELECTRONIC APPARATUS

(71) Applicant: Brillnics Inc., Grand Cayman (KY)

(72) Inventor: Toshinori Otaka, Tokyo (JP)

(73) Assignee: BRILLNICS INC., Grand Cayman (KY)

(*) Notice: Subject to any disclaimer, the term of this patent is extended or adjusted under 35 U.S.C. 154(b) by 0 days.

(21) Appl. No.: 16/182,082

(22) Filed: Nov. 6, 2018

(65) Prior Publication Data
US 2019/0149754 A1 May 16, 2019

(30) Foreign Application Priority Data

Nov. 10, 2017 (JP) .................. 2017-217067

(51) Int. Cl.
*H04N 5/355* (2011.01)
*H04N 5/378* (2011.01)
*H04N 5/369* (2011.01)
*H04N 5/3745* (2011.01)

(52) U.S. Cl.
CPC ....... *H04N 5/35545* (2013.01); *H04N 5/3559* (2013.01); *H04N 5/35554* (2013.01); *H04N 5/378* (2013.01); *H04N 5/379* (2018.08); *H04N 5/37452* (2013.01)

(58) Field of Classification Search
CPC ............... H04N 5/35545; H04N 5/379; H04N 5/37452; H04N 5/35554; H04N 5/3559; H04N 5/378
See application file for complete search history.

(56) References Cited

U.S. PATENT DOCUMENTS

| | | | |
|---|---|---|---|
| 7,164,114 B2 | 1/2007 | Lai et al. | |
| 8,553,122 B2 | 10/2013 | Nitta et al. | |
| 9,313,435 B2 | 4/2016 | Nitta et al. | |
| 9,386,240 B1* | 7/2016 | Johansson | H03M 1/466 |
| 9,402,039 B2* | 7/2016 | Solhusvik | H04N 5/3559 |
| 9,769,411 B2 | 9/2017 | Nitta et al. | |

(Continued)

FOREIGN PATENT DOCUMENTS

| | | |
|---|---|---|
| JP | 2005-278135 A | 10/2005 |
| JP | 2005-295346 A | 10/2005 |
| JP | 2008-70817 A | 3/2008 |

*Primary Examiner* — Mekonnen D Dagnew
(74) *Attorney, Agent, or Firm* — Westerman, Hattori, Daniels & Adrian, LLP

(57) ABSTRACT

A reading part, in a first reset period PR1, holds reset transistors in all pixels in a conductive state and executes a first conversion gain reset readout processing HCGRRD, stores an AD conversion code with respect to a first readout reset, signal HCGVRST in a memory part, then, in a transfer period PT1, holds the transfer transistors in all pixels in a conductive state to transfer the accumulated charges in photodiodes PD1 to FD1 to thereby execute a global shutter operation accumulating overflowed charges in storage capacitors CS1. The reading part, when reading each row, executes a first conversion gain signal readout processing, a second conversion gain signal readout processing, and a second conversion gain reset readout processing in order. Due to this, it becomes possible to realize digital pixels provided with a global shutter function at a small pixel pitch.

19 Claims, 23 Drawing Sheets

(56) References Cited

U.S. PATENT DOCUMENTS

| | | |
|---|---|---|
| 2010/0181464 A1 | 7/2010 | Veeder |
| 2011/0199526 A1 | 8/2011 | Nitta et al. |
| 2014/0285697 A1 | 9/2014 | Nitta et al. |
| 2015/0130977 A1* | 5/2015 | Ladd .................. H04N 5/347 |
| | | 348/308 |
| 2016/0227138 A1* | 8/2016 | Kozlowski ......... H04N 5/35563 |
| 2016/0295145 A1 | 10/2016 | Nitta et al. |
| 2019/0229138 A1* | 7/2019 | Lee .................. H01L 27/14643 |
| 2019/0306439 A1* | 10/2019 | Morales Delgado ........................ |
| | | G03H 1/0443 |

* cited by examiner

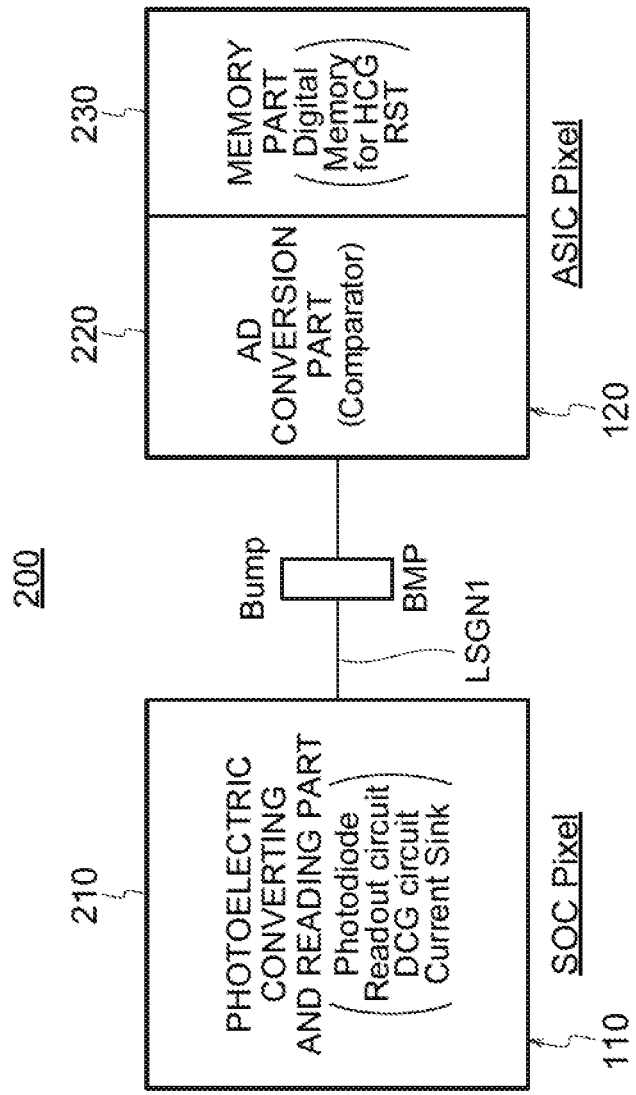

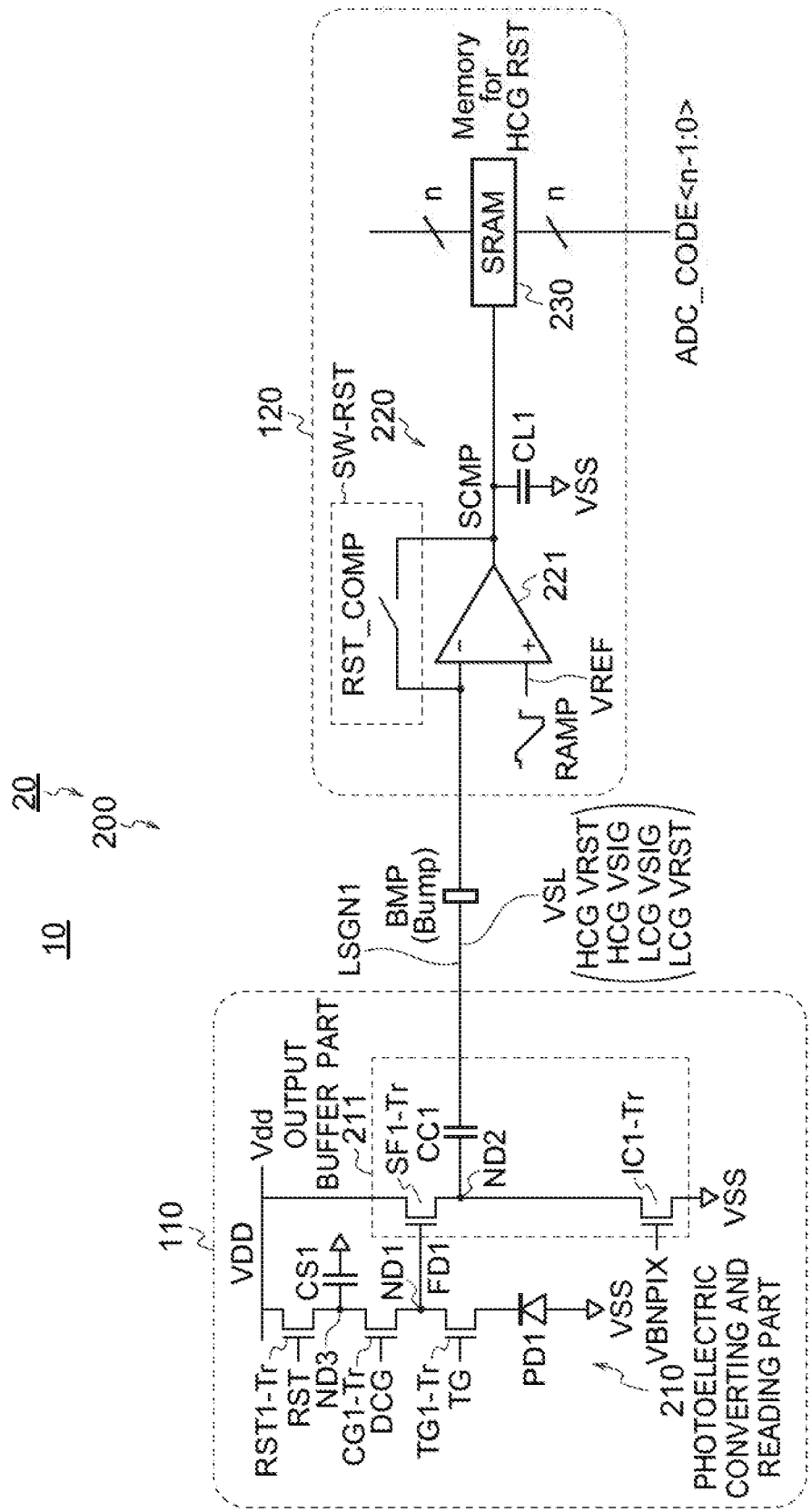

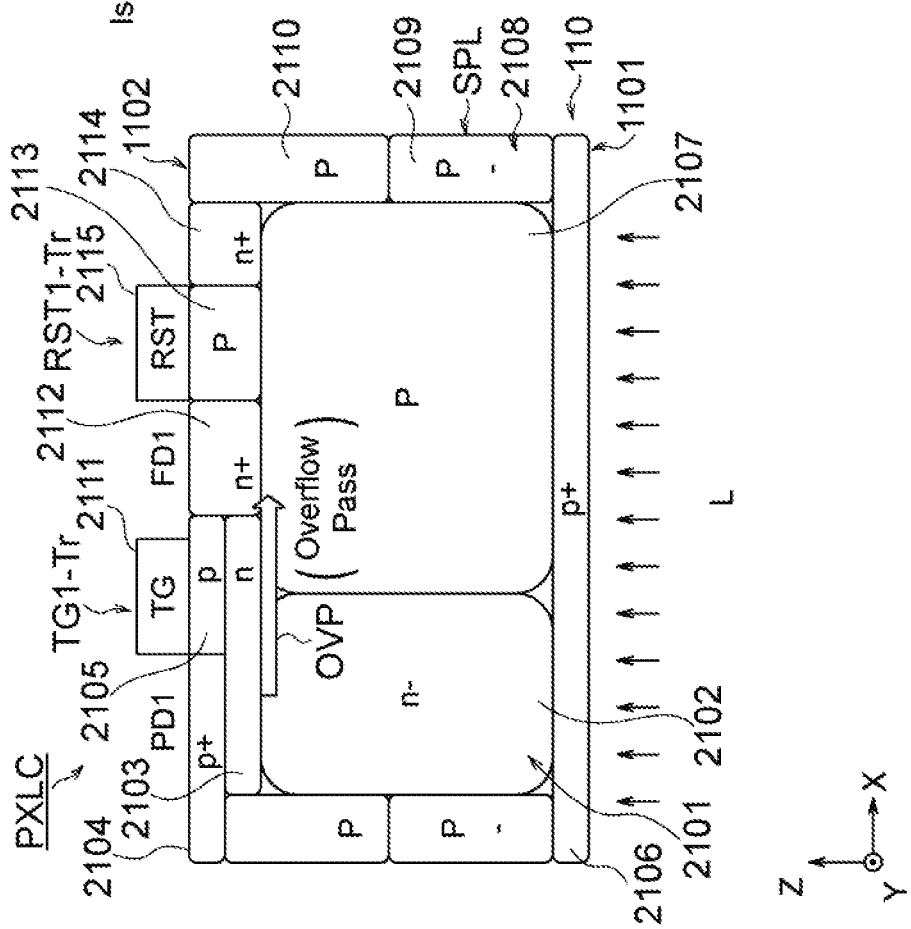

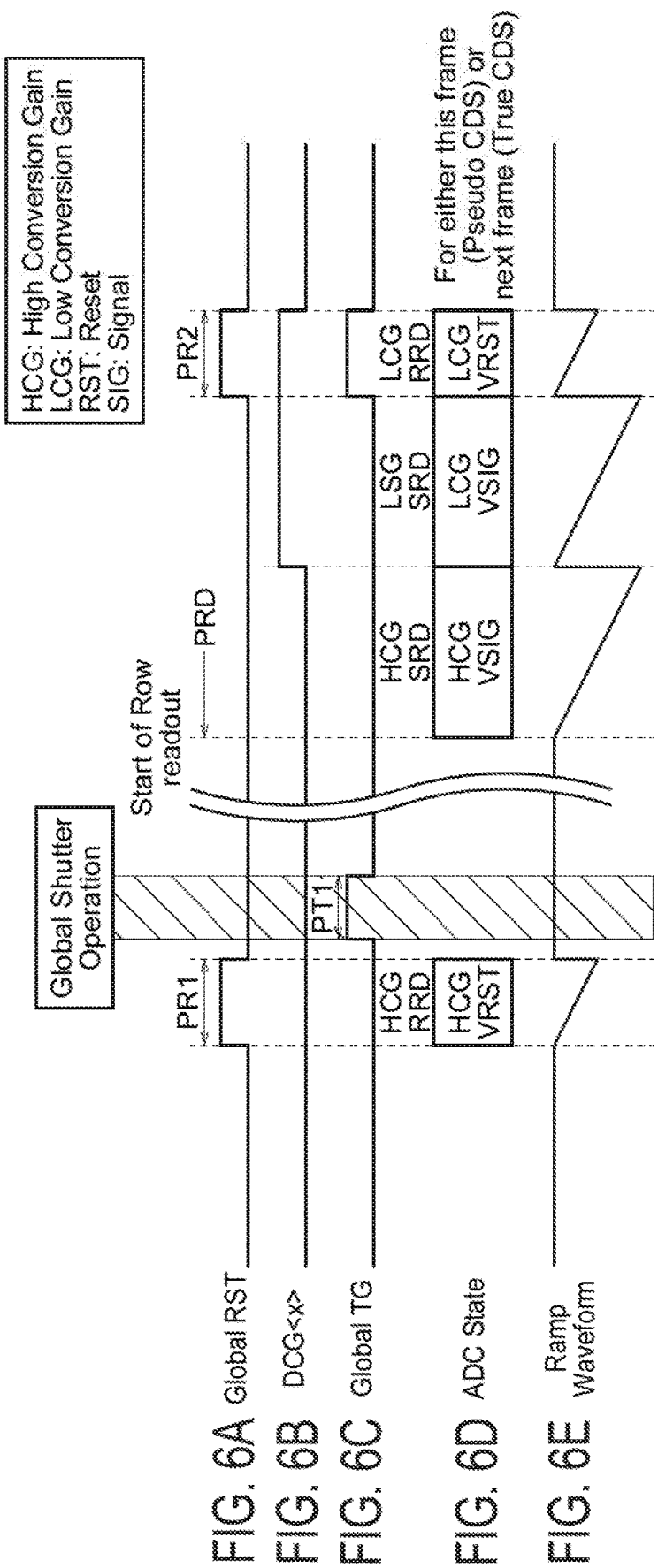

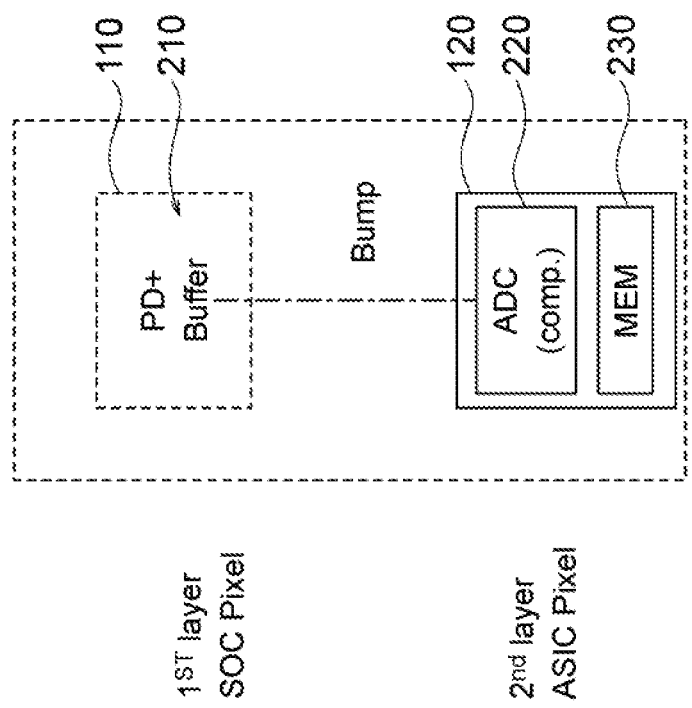
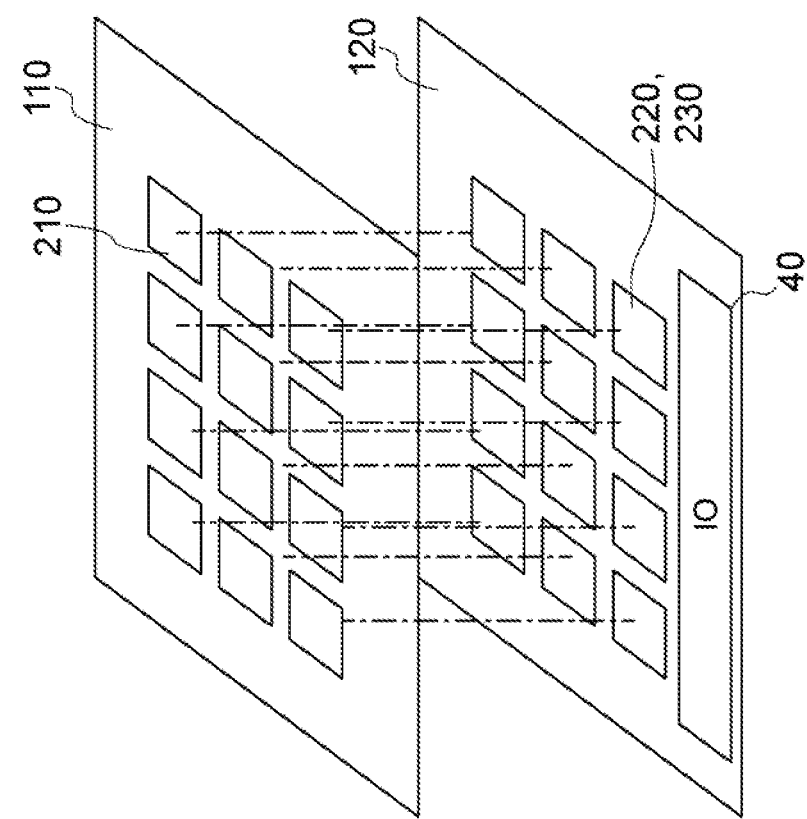

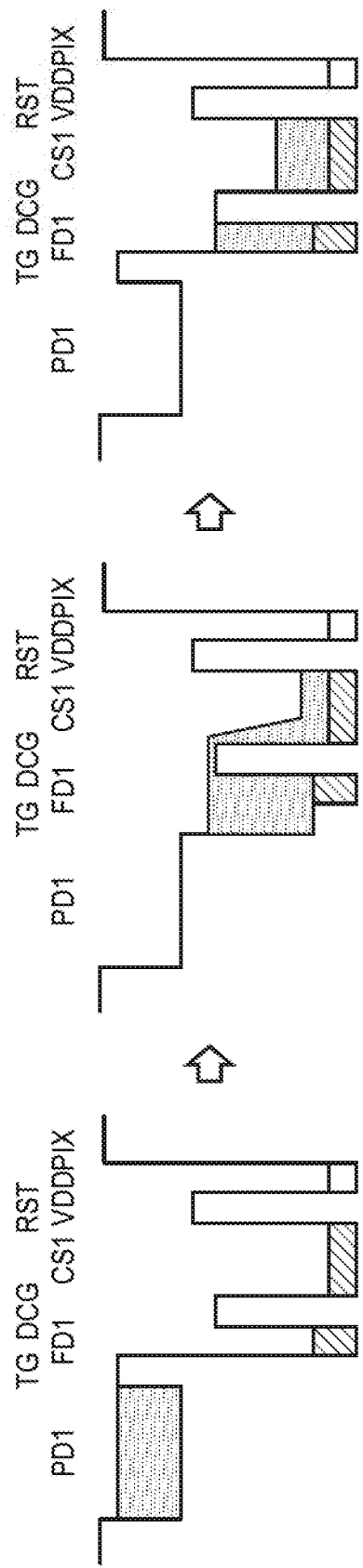

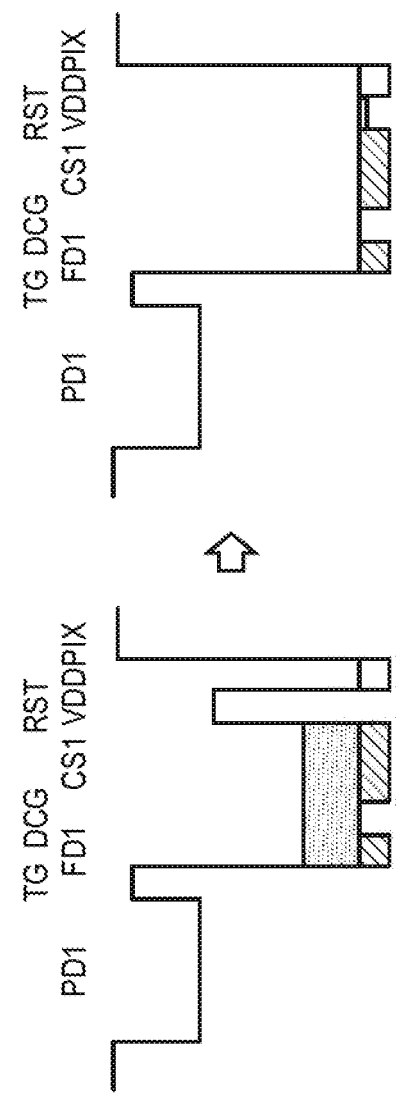

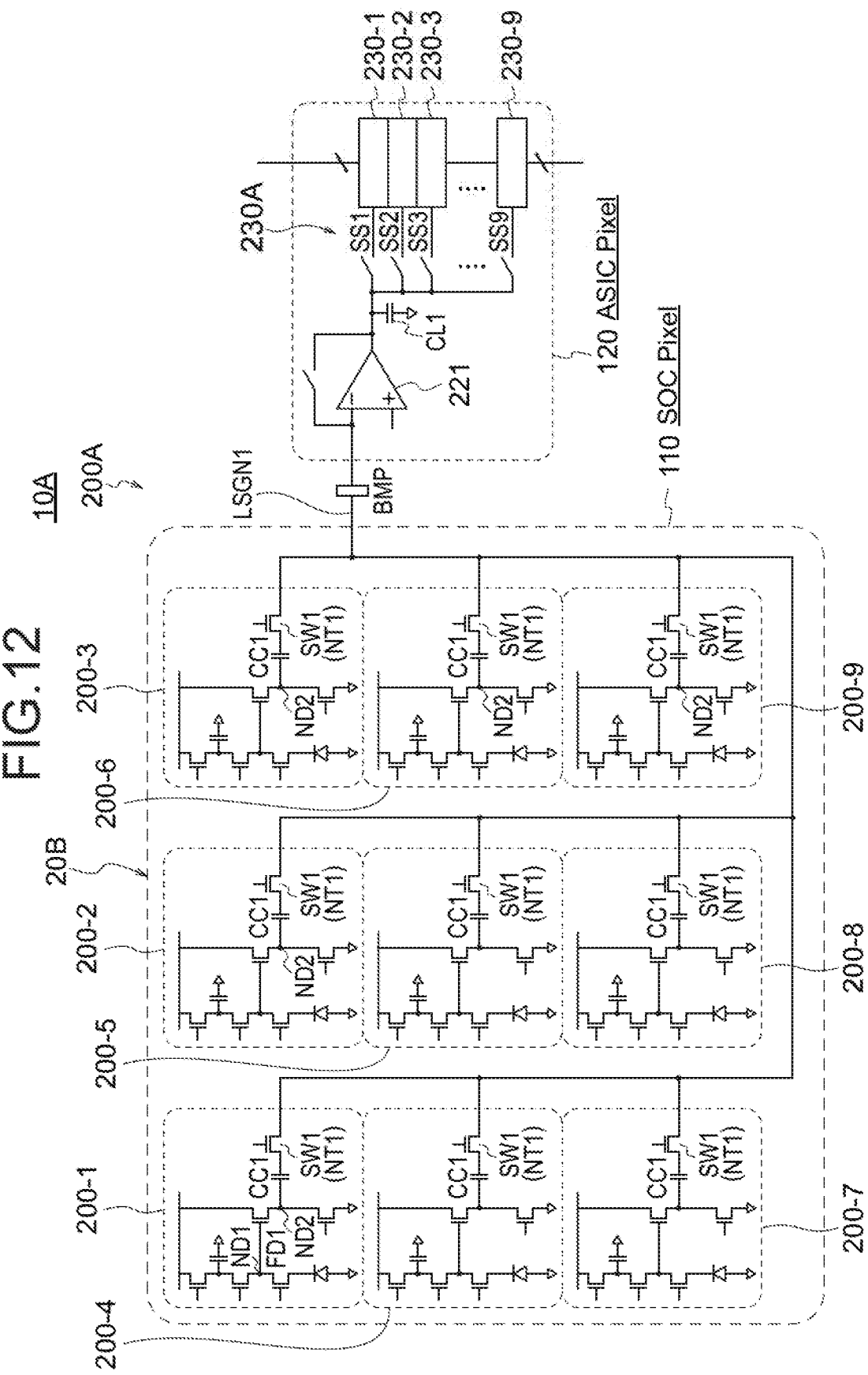

SOLID-STATE IMAGING DEVICE, METHOD FOR DRIVING SOLID-STATE IMAGING DEVICE, AND ELECTRONIC APPARATUS

CROSS-REFERENCE TO RELATED APPLICATIONS

The present invention contains subject matter related to Japanese Patent Application JP 2017-217057 filed in the Japan Patent Office on Nov. 20, 2017, the entire contents of which being incorporated herein by reference.

TECHNICAL FIELD

The present invention relates to a solid-state imaging device, a method for driving a solid-state imaging device, and an electronic apparatus.

BACKGROUND ART

As solid-state imaging devices (image sensors) using photoelectric conversion elements detecting light and generating a charge, CMOS (complementary metal oxide semiconductor) image sensors have been put into practical use. CMOS image sensors have been widely applied as parts of digital cameras, video cameras, monitoring cameras, medical endoscopes, personal computers (PC), mobile phones and other portable terminals (mobile devices) and other various types of electronic apparatuses.

A CMOS image sensor has a floating diffusion (FD) amplifier having a photodiode (photoelectric conversion element) and an FD layer (FD) for each pixel. Reading is performed by selecting a certain row in a pixel array and simultaneously reading out the pixels in a column direction, that is, a column parallel output type is the mainstream.

Further, various circuits have been proposed for the pixel signal readout (output) circuit of a column parallel output type CMOS image sensor. Among them, one of the most advanced circuits is a circuit which is provided with an analog-to-digital converter (ADC) for each column and extracts pixel signals as digital signals (for example, see Japanese Patent Publication No. 2005-278135 and Japanese Patent Publication No. 2005-295346).

In this column parallel ADC-mounting CMOS image sensor (column AD system CMOS image sensor), a comparator compares a so-called RAMP wave and the pixel signals and performs digital CDS by a later stage counter to thereby perform AD conversion.

In this type of CMOS image sensor, however, while high speed transfer of signals is possible, there is the disadvantage that a global shutter reading operation cannot be carried out.

Contrary to this, a digital pixel sensor in, which an ADC including a comparator (and further a memory part) is arranged in each pixel to also enable realization of a global shutter for executing the start of exposure and end of exposure at the same timings with respect to all pixels in the pixel array has been proposed (for example, see U.S. Pat. No. 7,164,114, B2, FIG. 4 and US Patent No. 2010/0181464, A1).

Technical Problem

In this regard, in the CMOS image sensors provided with the conventional digital pixel sensors explained above, it is possible to realize a global shutter function, but compared with sensors of the global shutter pixels of the charge mode and global shutter pixels of the voltage mode, the many transistors of the comparator and digital memory must be mounted in the pixels, therefore it is generally difficult to make the pixel pitch small.

However, head mount displays (HMD) and advanced driver-assistance systems MIDAS) and other sectors of the new machine vision market for VR (virtual reality) and AR (Augmented Reality) applications are being developed. In the midst of all of this, reduction of the pixel pitch in CMOS image sensors provided with the global shutter function is being strongly sought.

Known in the art is a head, mount display (HMD) which is attached to the head, of a user and can provide an individual user with an image by a display etc. arranged in front of his eyes (for example, see Japanese Patent Publication No. 2008-70817). In recent years, HMDs corresponding to VR (Virtual Reality) and AR (Augmented Reality) applications have been spreading.

A digital pixel can simultaneously achieve a broad dynamic range, high sensitivity, low noise, and high frame rate, therefore it is promising as pixel architecture for the global shutter technology when high-grade process technology can be utilized.

SUMMARY

Accordingly, the present invention provides a solid-state imaging device capable of realizing digital pixels provided with the global shutter function at a small pixel pitch, a method for driving such a solid-state imaging device, and an electronic apparatus.

Solution to Problem

A solid-state imaging device of a first aspect of the present invention has a pixel part in which pixels for performing photoelectric conversion are arranged and a reading part which reads out pixel signals from the pixel part, wherein each of the pixels includes a photoelectric conversion element which accumulates a charge generated by photoelectric conversion in an integration period, a transfer element capable of transferring the charge accumulated in the photoelectric conversion element in a transfer period after the integration period, an output node to which the charge accumulated in the photoelectric conversion element is transferred through the transfer element, a storage element connected to the output node, a storage capacity element which accumulates the charge at the output node through the storage element, a reset element which resets the output node to a predetermined potential in a reset period, an output buffer part which converts the charge at the output node to a voltage signal with a gain corresponding to a quantity of the charge and outputs the converted voltage signal, a comparator which performs an analog-to-digital (AD) conversion processing comparing the voltage signal of the output buffer part and a reference voltage and outputting a digitalized comparison result signal, and a memory part storing data corresponding to the comparison result signal of the comparator, the reading part, in a first reset period, can perform a first conversion gain reset readout processing reading a first readout reset signal converted with a first conversion gain corresponding to a first charge amount of the output node from the output buffer part and performing an AD conversion processing with respect to the first readout reset signal in the comparator, in a readout period subsequent to the transfer period after the first reset period, can perform a first conversion gain signal readout processing reading the first readout signal converted with the first conversion gain corresponding to the first charge amount of the output node from the output buffer part and performing the AD conversion processing with respect to the first readout signal in the comparator and can perform a second conversion gain signal readout processing reading, from the output buffer part, a second readout signal converted with a second conversion gain corresponding to a second charge amount obtained by combining the charge of the storage capacity element with the charge at the output node and performing the AD conversion processing with respect to the second readout signal in the comparator, and, in a second reset period, and can perform a second conversion gain reset readout processing reading a second readout reset signal converted with a second conversion gain corresponding to the second charge amount from the output buffer part and performing the AD conversion processing with respect to the second readout reset signal in the comparator and stores the data after the AD conversion processing in the comparator in the first conversion gain reset readout processing in the memory part.

A second aspect of the present invention is a method for driving a solid-state imaging device having a pixel part in which pixels for performing photoelectric conversion are arranged and a reading part which reads out the pixel signals from the pixel part, wherein each of the pixels includes a photoelectric conversion element which accumulates a charge generated by photoelectric conversion in an integration period, a transfer element capable of transferring the charge accumulated in, the photoelectric conversion element in a transfer period after the integration period, an output node to which the charge accumulated in, the photoelectric conversion element is transferred through the transfer element, a storage element connected to the output node, a storage capacity element which accumulates the charge at the output node through the storage element, a reset element which resets the output node to a predetermined potential in a reset period, an output buffer part which converts the charge at the output node to a voltage signal with a gain corresponding to a quantity of the charge and outputs the converted voltage signal, a comparator which performs an analog-to-digital (AD) conversion processing comparing the voltage signal by the output buffer part and a reference voltage and outputting a digitalized comparison result signal, and a memory part storing data corresponding to the comparison result signal of the comparator, comprising, under the control of the reading part, in a first reset period, performing a first conversion gain reset readout processing reading a first readout reset signal converted with a first conversion gain corresponding to a first charge amount of the output node from the output buffer part and performing an AD conversion processing with respect to the first readout reset signal in the comparator, in a readout period subsequent to the transfer period after the first reset period, performing a first conversion gain signal readout processing reading the first readout signal converted with the first conversion gain corresponding to the first charge amount of the output node from the output buffer part and performing the AD conversion processing with respect to the first readout signal in the comparator and performing a second conversion gain signal readout processing reading, from the output buffer part, a second readout signal converted with a second conversion gain corresponding to a second charge amount obtained by combining the charge of the storage capacity element with the charge at the output node and performing the AD conversion processing with respect to the second readout signal in the comparator and, in a second reset period, performing a second conversion gain reset readout processing reading a second readout reset signal converted with a second conversion gain corresponding to the second charge amount from the output buffer part and performing the AD conversion processing with respect to the second readout reset signal in the comparator and storing the data after the AD conversion processing in the comparator in the first conversion gain reset readout processing in the memory part.

An electronic apparatus of a third aspect of the present invention has a solid-state imaging device and an optical system for forming a subject image in the solid-state imaging device, wherein the solid-state imaging device has a pixel part in which pixels for performing photoelectric conversion are arranged and a reading part which reads out the pixel signals from the pixel, part, each of the pixels includes a photoelectric conversion element which accumulates a charge generated by photoelectric conversion in an integration period, a transfer element capable of transferring the charge accumulated in the photoelectric conversion element in a transfer period after the integration period, an output node to which the charge accumulated in the photoelectric conversion element is transferred through the transfer element, a storage element connected to the output node, a storage capacity element which accumulates the charge at the output node through the storage element, a reset element which resets the output node to a predetermined potential in a reset period, an output buffer part which converts the charge at the output node to a voltage signal with a gain corresponding to a quantity of the charge and outputs the converted voltage signal, a comparator which performs an analog-to-digital (AD) conversion processing comparing the voltage signal by the output buffer part and a reference voltage and outputting a digitalized comparison result signal, and a memory part storing data corresponding to the comparison result signal of the comparator, the reading part, in a first reset period, can perform a first conversion gain reset readout processing reading a first readout reset signal converted with a first conversion gain corresponding to a first charge amount of the output node from the output buffer part and performing an AD conversion processing with respect to the first readout reset signal in the comparator, in a readout period subsequent to the transfer period after the first reset period, can perform a first conversion gain signal readout processing reading the first readout signal converted with the first conversion gain corresponding to the first charge amount of the output node from the output buffer part and performing the AD conversion processing with respect to the first readout signal in the comparator and can perform a second conversion gain signal readout processing reading, from the output buffer part, a second readout signal converted with a second conversion gain corresponding to a second charge amount obtained by combining the charge of the storage capacity element with the charge at the output node and performing the AD conversion processing with respect to the second readout signal in the comparator, and, in a second reset period, can perform a second conversion gain reset readout processing reading a second readout reset signal converted with a second conversion gain corresponding to the second charge amount from the output buffer part and performing the AD conversion processing with respect to the second readout reset signal in the comparator, and stores the data after the AD conversion processing in the comparator in the first conversion gain reset readout processing in the memory part.

Advantageous Effects of Invention

According to the present invention, it becomes possible to realize digital pixels provided with a global shutter function with a small pixel pitch.

BRIEF DESCRIPTION OF DRAWINGS

FIG. 3 is a block diagram showing an example of a digital pixel in the solid-state imaging device according to the first embodiment of the present invention.

FIG. 4 is a circuit diagram showing an example of the digital pixel in the solid-state imaging device according to the first embodiment of the present invention.

FIG. 5A and FIG. 5B are simple cross-sectional views showing an example of the configuration of a principal part of the digital pixel according to the first embodiment of the present invention, that is, a charge integration and transfer system, and a potential diagram at the time of overflowing.

FIG. 6A to FIG. 6E are views showing an example of a read out sequence of digital pixels in the solid-state imaging device according to the first embodiment of the present invention.

FIG. 7A and FIG. 7B are schematic views for explaining a stacked structure of the solid-state imaging device according to the first embodiment.

FIG. 9A to FIG. 9C are first views showing the operation sequences and potential transitions for mainly explaining the reading operation in the pixel part at the time of the predetermined shutter mode in the solid-state imaging device according to the first embodiment.

FIG. 10A and FIG. 10B are second views showing the operation sequences and potential transitions for mainly explaining the reading operation in the pixel part at the time of the predetermined shutter mode in the solid-state imaging device according to the first embodiment.

FIG. 12 is a circuit diagram showing an example of the configuration of the digital pixel according to the second embodiment of the present invention.

DESCRIPTION OF EMBODIMENTS

Embodiments of the present invention will be hereinafter explained with reference to the drawings.

First Embodiment

Figure 1:
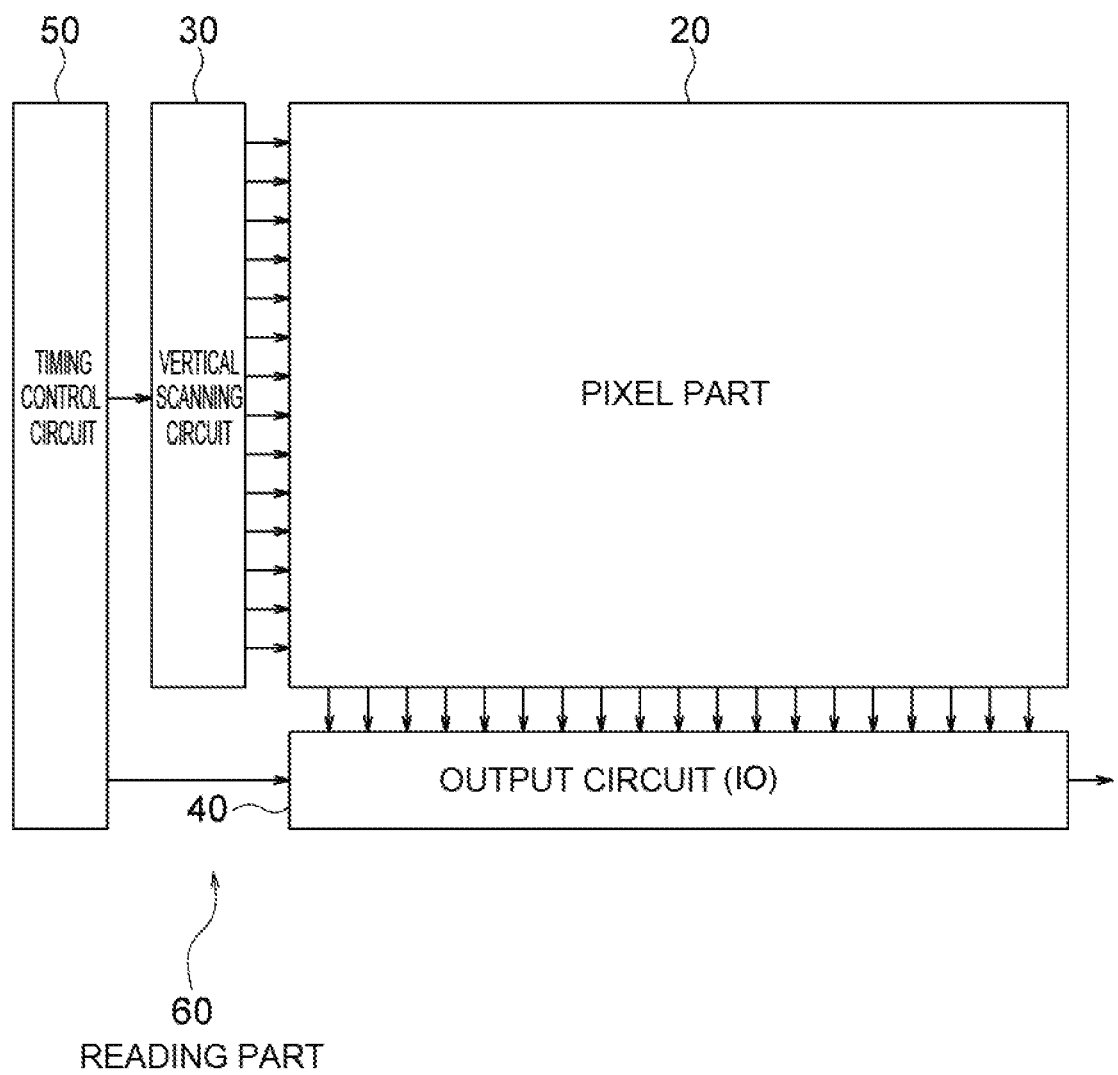
FIG. 1 is a block diagram showing an example of the configuration of a solid-state imaging device according to a first embodiment of the present invention.

FIG. 1 is a block diagram showing an example of the configuration of a solid-state imaging device according to a first embodiment of the present invention. In the present embodiment, a solid-state imaging device 10 is constituted by for example a CMOS image sensor including digital pixels as the pixels.

As shown in FIG. 1, the solid-state imaging device 10, is constituted mainly by an image capturing part constituted by a pixel part 20, a vertical scanning circuit (row scanning circuit) 30, an output circuit 40, and a timing control circuit 50. Among these components, for example, the vertical scanning circuit 30, the output circuit 40, and the timing control circuit 50 constitute the reading part 60 for reading out pixel signals.

In the first embodiment, the solid-state imaging device 10 is configured as for example a stacked type CMOS image sensor which, in the pixel part 20, includes digital pixels comprised of photoelectric converting and reading parts, AD (analog-to-digital) conversion parts and memory parts and has a global shutter operation function. In the solid-state imaging device 10 according to the first embodiment, as will be explained in detail later, each digital pixel DP has an AD conversion function, and the AD conversion part has a comparator which compares a voltage signal read out by the photoelectric converting and reading part and a reference voltage, performs an AD conversion processing with respect to a readout voltage signal VSL, and outputs a digitalized comparison result signal.

Further, in the solid-state imaging device 10 according to the first embodiment, in order to make it possible to realize digital pixels provided with the global shutter function at a small pixel pitch, the reading part 60 executes the readout processing of the pixel signals from the digital pixels and the data storage after the AD conversion processing as follows.

The reading part 60 can perform, in a first reset period PR1, a first conversion gain reset readout processing HCGRRD for reading from the output buffer part a first readout reset signal HCGVRST converted with a first conversion gain (for example high conversion gain: HCG) corresponding to a first charge amount of the floating diffusion FD1 as the output node and performing an AD conversion processing with respect to a first readout reset signal HCGVRST in the comparator. Further, the reading part 60 can perform, in a readout period PRD subsequent to a transfer period PT1 after the first reset period PR1, a first conversion gain signal readout processing HCGSRD for reading from the output buffer part a first readout signal HCGVSIG converted with the first conversion gain (HCG) corresponding to the first charge amount of the floating diffusion FD1 as the output node and performing the AD conversion processing with respect to the first readout signal HCGVSIG in the comparator. Further, the reading part 60 can perform a second conversion gain signal readout processing LCGSRD for reading, from the output buffer part, a second readout signal LCGVSIG converted with a second conversion gain (low conversion gain: LCG) corresponding to a second charge amount obtained by combining the charge of a storage capacity element CS1 with the charge of the floating diffusion FD1 as the output node and performing the AD conversion processing with respect to the second readout signal LCGVSIG in the comparator. Further, the reading part 60 can perform, in a second reset period PR2, a second conversion gain reset readout processing LCGRRD for reading from the output buffer part a second readout reset signal LCGVRST converted with the second conversion gain (LCG) corresponding to the second charge amount and performing the AD conversion processing with respect to the second reset signal LCGVRST in the comparator. Next, the reading part 60 in the first embodiment stores in the memory part the data (AD conversion code) output by the AD conversion processing of the comparator in the first conversion gain reset readout processing HCGRRD.

In the first reset period PR1, the reading part 60 in the first embodiment holds the reset transistors as the reset elements in all pixels in a conductive state and executes the first conversion gain reset readout processing HCGRRD stores the AD conversion code with respect to the first readout reset signal HCGVRST in the memory part, and then, in the transfer period PT1, holds the transfer transistors as the transfer elements in all pixels in a conductive state and transfers the charges accumulated in the photodiodes PD1 as the photoelectric conversion elements to the floating diffusions FD1 as the output nodes and executes the global shutter operation for causing the storage capacitors CS1 as the storage capacity elements to accumulate the overflowed charges. Further, when reading each row, the reading part 60 in the first embodiment executes the first conversion gain signal readout processing HCGSRD, the second conversion gain signal readout processing LCGSRD, and the second conversion gain reset readout processing LCGRRD in this order.

A detailed description will be hereinafter given of an outline of the configurations and functions of the parts in the solid-state imaging device 10, particularly the configurations and functions of the pixel part 20 and the digital pixels, the readout processing concerned with them, the stacked structure of the pixel part 20 and the reading part 60, and the like.

Configurations of Pixel Part 20 and Digital Pixel 200

Figure 2:
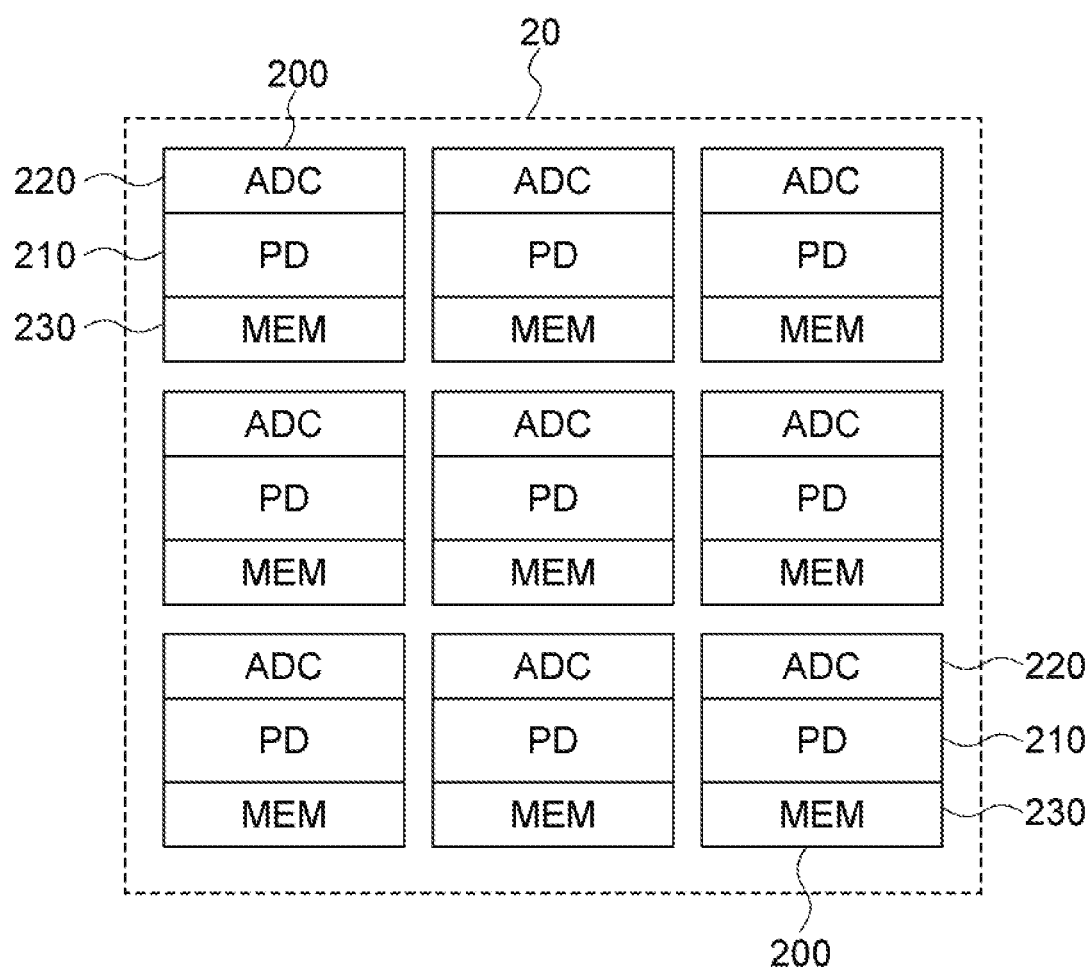
FIG. 2 is a view showing an example of a digital pixel array of a pixel part in the solid-state imaging device according to the first embodiment of the present invention.

FIG. 2 is a view showing an example of a digital pixel array in a pixel part of the solid-state imaging device 10 according to a first embodiment of the present invention. FIG. 3 is a block diagram showing an example of the digital pixel in the solid-state imaging device 10 according to the first embodiment of the present invention FIG. 4 is a circuit diagram showing an example of the digital pixel in the solid-state imaging device 10 according to the first embodiment of the present invention.

In the pixel part 20, as shown in FIG. 2, a plurality of digital pixels 200 are arranged in a matrix comprised of N rows and M columns. Note that for simplification of the drawing, FIG. 2 shows an example in which nine digital pixels 200 are arranged in a matrix comprised of three rows and three columns (matrix where M=3 and N=3).

The digital pixel 200 according to the first embodiment includes a photoelectric converting and, reading part (denoted as PD in FIG. 2) 210, AD conversion part (denoted as ADC in FIG. 2) 220, and memory part (denoted as MEM in FIG. 2) 230. The pixel part 20 in the first embodiment, as will be explained in detail later, is configured as a laminated type CMOS image sensor constituted by a first substrate 110 and a second substrate 120. In the present example, as shown in FIG. 3 and FIG. 4, the photoelectric converting and reading part 210 is formed on the first substrate 110, and the AD conversion part 220 and the memory part 230 are formed on the second substrate 120.

The photoelectric converting and reading part 210 in the pixel 200 includes a photodiode (photoelectric conversion element) and an in-pixel amplifier. Specifically, the photoelectric converting and reading part 210 has for example a photodiode PD1 as a photoelectric conversion element. The photodiode PD1 has one each of a transfer transistor TG1-Tr as a transfer element, a reset transistor RST1-Tr as a reset element, a source follower transistor SF1-Tr as a source follower element, a current transistor IC1-Tr as a current source element, a storage transistor CG1-Tr as a storage element, a storage capacitor CS1 as a storage capacity element, a floating diffusion FD1 as an output node ND1, a readout node ND2, and a coupling capacitor CC1. In this way, the photoelectric converting and reading part 210 in the digital pixel 200 according to the first embodiment includes the five transistors (5Tr) of the transfer transistor TG1-Tr, the reset transistor RST1-Tr, the source follower transistor SF1-Tr, the current transistor IC1-Tr, and the storage transistor CG1-Tr.

Further, in the first embodiment, an output buffer part 211 includes the source follower transistor SF1-Tr, the current transistor IC1-Tr, the readout node ND2, and the coupling capacitor CC1.

In the photoelectric converting and reading part 210 according to the first embodiment, the readout node ND2 of the output buffer part 211 is connected through the coupling capacitor CC1 to the input part of the AD conversion part 220.

The coupling capacitor CC1 is connected between the readout node ND2 in the output buffer part 211 and the first input terminal of the comparator 221 in the AD conversion part 220, and the output buffer part 211 of the photoelectric converting and reading part 210 on the first substrate 110 side and the input part of the comparator 221 in the AD conversion part 220 on the second substrate 120 side are AC-coupled whereby the device is configured so that noise is lowered and a high SNR can be achieved at the time of a low light intensity. Further, the photoelectric converting and reading part 210 converts the charge of the floating diffusion FD1 as the output node ND1 to a voltage signal corresponding to the quantity of charge and outputs the converted voltage signal VSL to the AD conversion part 220.

More specifically, the photoelectric converting and reading part 210, as the first conversion gain reset readout processing HCGRRD, in the first reset period PR1, reads out from the output buffer part 211 the first readout reset signal HCGVRST converted with the first conversion gain (for example high conversion gain: HCG) corresponding to the first charge amount of the floating diffusion FD1 as the output node ND1. The photoelectric converting and reading part 210, as the first conversion gain signal readout processing HCGSRD, in the readout period PRD subsequent to the transfer period PT1 after the first reset period PR1, reads out from the output buffer part 211 the first readout signal HCGVSIG converted with the first conversion gain (HCG) corresponding to the first charge amount of the floating diffusion FD1 as the output node ND1.

Next, the photoelectric converting and reading part 210, as the second conversion gain signal readout processing LCGSRD, reads out, from the output buffer part 211, a second readout signal LCGVSIG2 converted with the second conversion gain (low conversion gain: LCG) corresponding to the second charge amount obtained by combining the charge of the storage capacity element CS1 with the charge of the floating diffusion FD1 as the output node ND1. Next, the photoelectric converting and reading part 210, as the second conversion gain reset readout processing LCGRRD, in the second reset period PR2, reads out from the output buffer part 211 the second readout reset signal LCGVRST converted with the second conversion gain (LCG) corresponding to the second charge amount.

The photodiode PD1 generates a signal charge (here, electrons) in an amount in accordance with the quantity of the incident light and accumulates the same. Below, an explanation will be given of a case where the signal charge is electrons and each transistor is an n-type transistor. However, the signal charge may be positive holes (holes), or each transistor may be a p-type transistor. Further, the present embodiment is effective also in a case where each transistor is shared among a plurality of photodiodes and transfer transistors.

In each digital pixel 200, the photodiode (PD) is constituted by a pinned photodiode (PPD) On the substrate surface for forming the photodiode (PD), there is a surface level due to dangling bonds or other defects, therefore a lot of charges (dark current) are generated due to heat energy, so a correct signal fails to be read out. In a pinned photodiode (PPD), the charge storage part of the photodiode (PD) is pinned in the substrate, so it becomes possible to reduce mixing the dark current into the signal.

The transfer transistor TG1-Tr in the photoelectric converting and reading part 210 is connected between the photodiode PD1 and the floating diffusion FD1 and is controlled by a control signal TG applied through a control line to the gate. The transfer transistor TG1-Tr is selected to enter a conductive state in the transfer period PT in which the control signal TG is at a high (H) level. It transfers the charge (electrons) which is photo-electrically converted and accumulated in the photodiode PD1 to the floating diffusion FD1. Note that, after the photodiode PD1 and floating diffusion FD1 are reset to the predetermined reset potentials, the transfer transistor TG1-Tr enters a non-conductive state in which the control signal TG is at a low (L) level, and the photodiode PD1 enters into the integration period PI. However, at this time, if the intensity (quantity) of the incident light is very high, the charge exceeding the saturated charge amount overflows to the floating diffusion FD1 as the overflow charge through the overflow path under the transfer transistor TG1-Tr.

The reset transistor RST1-Tr is connected between the power supply line Vdd of the power supply voltage VDD and the floating diffusion FD1 and is controlled by the control signal RST supplied through the control line to the gate. The reset transistor RST1-Tr is selected to enter a conductive state in the reset period in which the control signal RST is at the H level and resets the floating diffusion FD1 to the potential of the power supply line Vdd of the power supply voltage VDD.

The storage transistor CG1-Tr is connected between the floating diffusion FD1 and the reset transistor RST1-Tr, while the storage capacitor CS1 is connected between a connection node ND3 of the two and a reference potential VSS. The storage transistor CG1-Tr is controlled by a control signal DCG applied to the gate through a control line. The storage transistor CT1-Tr is selected to enter a conductive state in the reset period where the control signal DCG is at an H level and connects the floating diffusion FD1 and the storage capacitor CS1.

At the time of the first conversion gain signal readout processing HCGSRD, the storage transistor CG1-Tr is held in a non-conductive state and separates the charge of the floating diffusion FD1 as the output node ND1 and the charge of the storage capacitor CS1 for the readout processing. At the time of the second conversion gain signal readout processing LCGSRD, the storage transistor CG1-Tr is held in a conductive state and combines the charge of the floating diffusion FD1 as the output node ND1 and the charge of the storage capacitor CS1 for the readout processing. At the time of the second conversion gain reset readout processing LCGRRD, the reset transistor RST1-Tr and the storage transistor CG1-Tr are held in a conductive state and clear the charge of the floating diffusion FD1 as the output node ND1 and the charge of the storage capacitor CS1 for the readout processing.

The source follower transistor SF1-Tr as the source follower element is connected at the source to the readout node ND2, is connected at the drain side to the power supply line Vdd, and is connected at the gate to the floating diffusion FD1. The drain and source of the current transistor IC1-Tr as the current source element are connected between the readout node ND2 and the reference potential VSS (for example GND). The gate of the current transistor IC1-Tr is connected to a supply line of a control signal VBNPIX. On a signal line LSGN1 between the readout node ND2 and the input part of the AD conversion part 220, the coupling capacitor CC1 is connected. Further, the signal line LSGN1 between the readout node ND2 and the input part of the AD conversion part 220 is driven by the current transistor IC1-Tr as the current source element.

FIG. 5A and FIG. 5B are schematic cross-sectional views showing an example of the configuration of the principal part of a digital pixel according to the first embodiment of the present invention, that is, the charge integration and transfer system, and a potential diagram at the time of overflowing.

Each digital pixel cell PXLC is formed on a substrate (first substrate 110 in the present example) having a first substrate surface 1101 side to which a light L is irradiated (for example back surface side) and a second substrate surface 1102 side on the side opposite to the first substrate surface 1101 side, and is separated by separation layers SPL. Further, the digital pixel cell PLXC in FIG. 5A includes parts forming the photoelectric converting and reading part 210 such as the photodiode PD1, the transfer transistor TG1-Tr, the floating diffusion FD1, the reset transistor RST1-Tr, the separation layers SPL, and further a color filter part and micro-lens (not shown Configuration of Photodiode The photodiode PD1 includes a semiconductor layer (n-layer is the present embodiment) 2101 of a first conductivity type (n-type in the present embodiment) formed so as to be pinned in the semiconductor substrate having the first substrate surface 1101 side and the second substrate surface 1102 side on the side opposite to the first substrate surface 1101 side and is formed so as to have a photoelectric conversion function of the received light and charge accumulation function. In the side portions of the photodiode PD1 in a direction (X-direction in an orthogonal coordinate system in the drawing) perpendicular to the normal line of the substrate, second conductivity type (p-type in the present embodiment) separation layers SPL are formed.

In this way, in the present embodiment, in each digital pixel cell PXLC is constituted by a pinned photodiode (PPD). On the substrate surface for forming the photodiode (PD), there is a surface level due to dangling bonds or another defects, therefore a lot of charges (dark current) are generated due to heat energy, so a correct signal fails to be read out. In a pinned photodiode (PPD), the charge storage part of the photodiode (PD) is pinned in the substrate, so it becomes possible to reduce mixing the dark current into the signal.

In the photodiode PD1 in FIG. 5A, the n-layer (first conductivity type semiconductor layer) 2101 is configured so as to have a two-layer structure in the normal line direction of the substrate 110 (Z-direction in the orthogonal coordinate system in the drawing). In the present example, an n$^-$-layer 2102 is formed on the first substrate surface 1101 side, an n-layer 2103 is formed on the second substrate surface 1102 side of the n$^-$-layer 2102, and a p$^+$-layer 2104 and a p-layer 2105 are formed on the second substrate surface 1102 side of the n-layer 2103. Further, a p$^+$-layer 2106 is formed on the first substrate surface 1101 side of the n$^-$-layer 2102. The p$^+$-layer 2106 is formed uniformly covering not only the photodiode P11, but also the separation layers SPL and further other digital pixel cells PXLC.

Note, that, on the light incident side of the p$^+$-layer 2106, a color filter part is formed. Further, a micro-lens is formed on the light incident side of the color filter part so as to correspond to a portion of the photodiode PD1 and separation layers SPL.

These configurations are one example. The structure may be a single-layer structure or may be a three-layer, four-layer, or higher stacked structure.

Configuration of Separation Layers in X-Direction (Column Direction)

In a p-type separation layer SPL in the X-direction (column direction) in FIG. 5A, a first p-layer (second conductivity type semiconductor layer) 2107 is formed on the side contacting the n$^-$-layer 2102 of the photodiode PD1 and at the right side part in the direction (X-direction in the orthogonal coordinate system in the drawing) perpendicular to the normal line of the substrate. Further, in a p-type separation layer SPL, on the right side in the X-direction of the first p-layer 2107, a second p-layer (second conductivity type semiconductor layer) 2108 is formed so as to give a two-layer structure in the normal line direction of the substrate 110 (Z-direction in the orthogonal coordinate system in the drawing). In the present example, in the second p-layer 2108, a p$^-$-layer 2109 is formed on the first substrate surface 1101 side, while a p-layer 2110 is formed on the second substrate surface 1102 side of the p$^-$-layer 2109.

These configurations are one example. The structure may be a single-layer structure or may be a three-layer, four-layer, or higher stacked structure.

On the first substrate surface 1101 side of the first p-layer 2107 and the second p$^-$-layer 2109 in the p-type separation layer SPL, a p$^+$-layer 2106 the same as the photodiode PD1 is formed.

An n-layer 2103 is formed so as to extend so that an overflow path OVP is formed covering a portion on the second substrate surface 1102 side of the first p-layer 2107 in the p-type separation layer SPL. Further, on the p-layer 2105 on the second substrate surface 1102 side of the n-layer 2103, a gate electrode 2111 of the transfer transistor TG1-Tr is formed through a gate insulation film. Further, on the second substrate surface 1102 side of the first p-layer 2107 in the p-type separation layer SPL, an n$^+$-layer 2112 for forming the floating diffusion FD1 is formed. A p-layer 2113 for forming the channel-forming region of the reset transistor RST1-Tr is formed adjacent to the n$^+$-layer 2112 while an n$^+$-layer 2114 is formed adjacent to the p-layer 2113. Further, on the p-layer 2113, a gate electrode 2115 is formed through a gate insulation film.

In such a structure, if the intensity (quantity) of the incident light is very high, a charge exceeding the saturated charge amount overflows as the overflow charge to the floating diffusion FD1 through the overflow path OVP under the transfer transistor TG1-Tr.

The AD conversion part 220 in the digital pixel 200 has a function converting an analog voltage signal VSL output by the photoelectric converting and reading part 210 to a digital signal by comparing it with the reference voltage VREF of the ramp waveform changed with a predetermined inclination or of the fixed voltage.

The AD conversion part 220, as shown in FIG. 4, includes a comparator (COMP) 221, an output side load capacitor CL1, and a reset switch SW-RST.

In the comparator 221, the inverted input terminal (−) as the first input terminal is supplied with the voltage signal VSL which was output from the output buffer part 211 of the photoelectric converting and reading part 210 to the signal line LSGN1, while the non-inverted input terminal (+) as the second input terminal is supplied with the reference voltage VREF. The comparator 221 performs AD conversion processing (comparison processing) comparing the voltage signal VST and the reference voltage VREF and outputting the digitalized comparison result signal SCMP.

In the comparator 221, the coupling capacitor CC1 is connected to the inverted input terminal (−) as the first input terminal. By AC-coupling of the output buffer part 211 of the photoelectric converting and reading part 210 on the first substrate 110 side and the input part of the comparator 221 in the AD conversion part 220 on the second substrate 120 side, it is possible to lower noise and to realize a high SNR at the time of low light.

Further, in the comparator 221, the reset switch SW-RST is connected between the output terminal and the inverted input terminal (−) as the first input terminal, while the load capacitor CL1 is connected between the output terminal and the reference potential VSS.

Basically, in the AD conversion part 220, the analog signal (potential VSL) read out from the output buffer part 211 of the photoelectric converting and reading part 210 to the signal line LSGN1 is compared in the comparator 221 with the reference voltage VREF, for example, a ramp signal RAMP with a slope waveform linearly changing with a certain inclination. At this time, a not shown counter which is arranged for each column in the same way as the comparator 221 is operating. Therefore, by the ramp signal RAMP with the ramp waveform and the counter value changing in one-to-one correspondence, the voltage signal VSL is converted to a digital signal. Basically, in the AD conversion part 220, the change of the reference voltage VREF (for example ramp signal RAMP) is conversion of a change of voltage to a change of time. By counting that time in certain cycle (clock), it is converted to a digital value. Further, when the analog signal VSL and the ramp signal RAMP (reference voltage VREF) cross, the output of the comparator 221 inverts and the input clock of the not shown counter is stopped or the clock stopped being input is input to the not shown counter. The value (data) of the counter at that time is stored in the memory part 230 to thereby complete the AD conversion. After the end of the above AD conversion period, the data (signal) stored in the memory part 230 in each digital pixel 200 is output from the output circuit 40 to a not shown signal processing circuit, whereupon a two-dimensional image is generated by predetermined signal processing.

The memory part 230 is configured by an SRAM or DRAM, and the digital-converted signal is supplied to this. The signal corresponds to the photo conversion code and can be read out by an external 10 buffer of the output circuit 40 on the periphery of the pixel array.

The vertical scanning circuit 30 drives the photoelectric converting and reading parts 210 in the digital pixels 200 through the row scanning control line in the shutter rows and read rows under the control of the timing control circuit 50. Under the control of the timing control circuit 50, the vertical scanning circuit 30 supplies the reference voltage VREF set according to the comparison processing to the comparators 221 in the digital pixels 200. Further, the vertical scanning circuit 30, according to the address signals, outputs the row selection signals of row addresses of the read row for reading of the signal and the shutter row for resetting the charges accumulated in the photodiodes PD.

The output circuit 40, for example, includes the IO buffer arranged corresponding to the memory output of each digital pixel 200 in the pixel part 20 and outputs the digital data read out from each digital pixel 200 to the outside.

The timing control circuit 50 generates timing signals necessary for signal processing of the pixel part 20, the vertical scanning circuit 30, the output circuit 40, and the like.

In the first embodiment, for example, at the time of the global shutter mode, the reading part 60 performs the readout control of the pixel signals from the digital pixels 200.

Readout Control of Pixel Signals from Digital Pixels 200 by Reading Part 60

Next, the readout control of the pixel signals from the digital pixels 200 by the reading part 60 according to the first embodiment will be specifically explained related to FIG. 6A to FIG. 6E.

FIG. 6A to FIG. 6E are views showing an example of a read out sequence of digital pixels in the solid-state imaging device 10 according to the first embodiment of the present invention.

The reading part 60, as shown in FIG. 6A to FIG. 6E, first, in the first reset period PR1, performs the first conversion gain reset readout processing HCGRRD reading the first readout reset signal HCGVRST converted with the first conversion gain (high conversion gain: HCG) corresponding to the first charge amount of the floating diffusion FD1 as the output node ND1 from the output buffer part 211 and performing the AD conversion processing with respect to the first readout reset signal HCGVRST in the comparator 221. The reading part 60, in the first reset period PR1, holds the reset transistors RST1-Tr as the reset elements in all pixels in a conductive state, executes the first conversion gain reset readout processing HCGRRD, and stores the AD conversion code with respect to the first readout reset signal HCGVRST in the memory part 230.

The reading part 60, after storing the AD conversion code with respect to the first readout reset signal HCGVRST in the memory part 230, in the transfer period PT1, holds the transfer transistors TG1-Tr as the transfer elements in all pixels in a conductive state, transfers the charges accumulated in the photodiodes PD1 as the photoelectric conversion elements to the floating diffusions FD1 as the output nodes ND1, and executes the global shutter operation making the storage capacitor CS1 as the storage capacity element accumulate the overflowed charges.

Further, the reading part 60 in the first embodiment, when reading each row, executes the first conversion gain signal readout processing HCGSRD, the second conversion gain signal readout processing LCGSRD, and the second conversion gain reset readout processing LCGRRD in the described order.

Specifically, the reading part 60, in the readout period PRD subsequent to the transfer period PT1 after the first reset period PR1, performs the first conversion gain signal readout processing HCGSRD reading the first readout signal HCGVSIG converted with the first conversion gain (HCG) corresponding to the first charge amount of the floating diffusion FD1 as the output node ND1 from the output buffer part 211 and performing the AD conversion processing with respect to the first readout signal HCGVSIG in the comparator 221. The reading part 60, during the execution period of the first conversion gain signal readout processing HCGSRD, renders the control signal DCG the L level to hold the storage transistor CG1-Tr in a non-conductive state and separates the charge of the floating diffusion FD1 as the output node ND1 and the charge of the storage capacitor CS1 as the storage capacity element to thereby hold the charge amount of the floating diffusion FD1 at the first charge amount.

Next, the reading part 60 performs the second conversion gain signal readout processing LCGSRD reading, from the output buffer part 211, the second readout signal LCGVSIG converted with the second conversion gain (low conversion gain: LCG) corresponding to the second charge amount obtained by combining the charge of the storage capacitor CS1 as the storage capacity element with the charge of the floating diffusion FD1 as the output node ND1 and performing AD conversion processing with respect to the second readout signal LCGVSIG in the comparator 221. The reading part 60, during the execution period of the second conversion gain signal readout processing LCGSRD, renders the control signal DCG the H level to hold the storage transistor CG1-Tr in a conductive state and combines the charge of the floating diffusion FD1 as the output node ND1 and the charge of the storage capacitor CS1 as the storage capacity element to thereby hold the charge amount of the floating diffusion FD1 at the second charge amount.

Next, the reading part 60, in the second reset period PR2, performs the second conversion gain reset readout processing LCGRRD reading the second readout reset signal LCGVRST converted with the second conversion gain (LCG) corresponding to the second charge amount from the output buffer part 211 and performing the AD conversion processing with respect to the second readout reset signal LCGVSIG in the comparator 221. The reading part 60, during the execution period of the second conversion gain reset readout processing LCGRRD, renders the control signal DCG the H level to hold the storage transistor CG1-Tr in a conductive state and renders the control signal RST the H level to hold the reset transistor RST1-Tr as the reset element in a conductive state to thereby clear the charge in the floating diffusion FD1 as the output node ND1 and the charge in the storage capacitor CS1 as the storage capacity element.

Further, the reading part 60 in the first embodiment, in the memory part 230, stores only the data (AD conversion code) after the AD conversion processing in the comparator in the first conversion gain reset readout processing HCGRRD.

The readout frame is executed by reading the digital signal data from the memory node. It has such an MIPI data format and is, for example, sent to the outside of the solid-state imaging device 10 (image sensor) through an IO buffer of the output circuit 40. This operation can be globally executed with respect to the entire pixel array.

Further, in the pixel part 20, the reset transistors RST1-Tr and transfer transistors TG1-Tr are used to reset the photodiodes PD1 simultaneously for all of the pixels to thereby start the exposure for all of the pixels simultaneously and in parallel. Further, after the predetermined exposure period (integration period) ends, the transfer transistors TG1-Tr are used to sample the output signals from the photoelectric converting and reading parts 210 at the AD conversion parts 220 and memory parts 230 to thereby end the exposure simultaneously and in parallel for all pixels. Due to this, a global shutter operation is realized electronically.

Note that, the reading part 60 can be configured so as to store the AD conversion code with respect to the second readout reset signal LCGVRST according to the second conversion gain reset readout processing LCGRRD in the memory part 230 for the next frame as well.

As described above, the reading part 60, in the readout control of the pixel signals from the digital pixels 200, executes an analog CDS (auto zero) and digital CDS (AD conversion) in both of the readout signal according to the high conversion gain HCG and the readout signal according to the low conversion gain LCG. However in the memory part 230, only the data (AD conversion code) after the AD conversion processing in the comparator in the first conversion gain reset readout processing HCGRRD is stored. In a case of reading each row, the AD conversion processings of the remaining first conversion gain signal readout processing HCGSRD, the second conversion gain signal readout processing LCGSRD, and the second conversion gain reset readout processing LCGRRD are executed. Due to this, it becomes possible to lower the necessity of the digital memory in the digital pixel 200 and remove unnecessary memory. Concerning this point, while the CDS in the reading operation according to the high conversion gain HCG is true CDS, the CDS in the reading operation according to the low conversion gain LCG may be a pseudo CDS if it is used in this frame. In this case, reset noise is removed with respect to the reading operation according to the high conversion gain HCG. This means that only the DC fluctuation is removed with respect to the reading operation according to the low conversion gain. LCG.

Contrary to this, at the joined point, when the AD conversion code with respect to the second readout reset signal LCGVRST according to the second conversion gain reset readout processing LCGRRD is stored in the memory part 230 and is used for the next frame, a true CDS operation is realized for the reading operation according to the low conversion gain LCG. Further, in the first embodiment, the transfer transistors TG1-Tr in all of the digital pixels 200 are rendered a conductive state simultaneously and in parallel to guarantee the global shutter operation, and the signals thereof are held under a light-shielding region.

Stacked Structure of Solid-State Imaging Device 10

Next, the stacked structure of the solid-state imaging device 10 according to the first embodiment will be explained.

Figure 8:
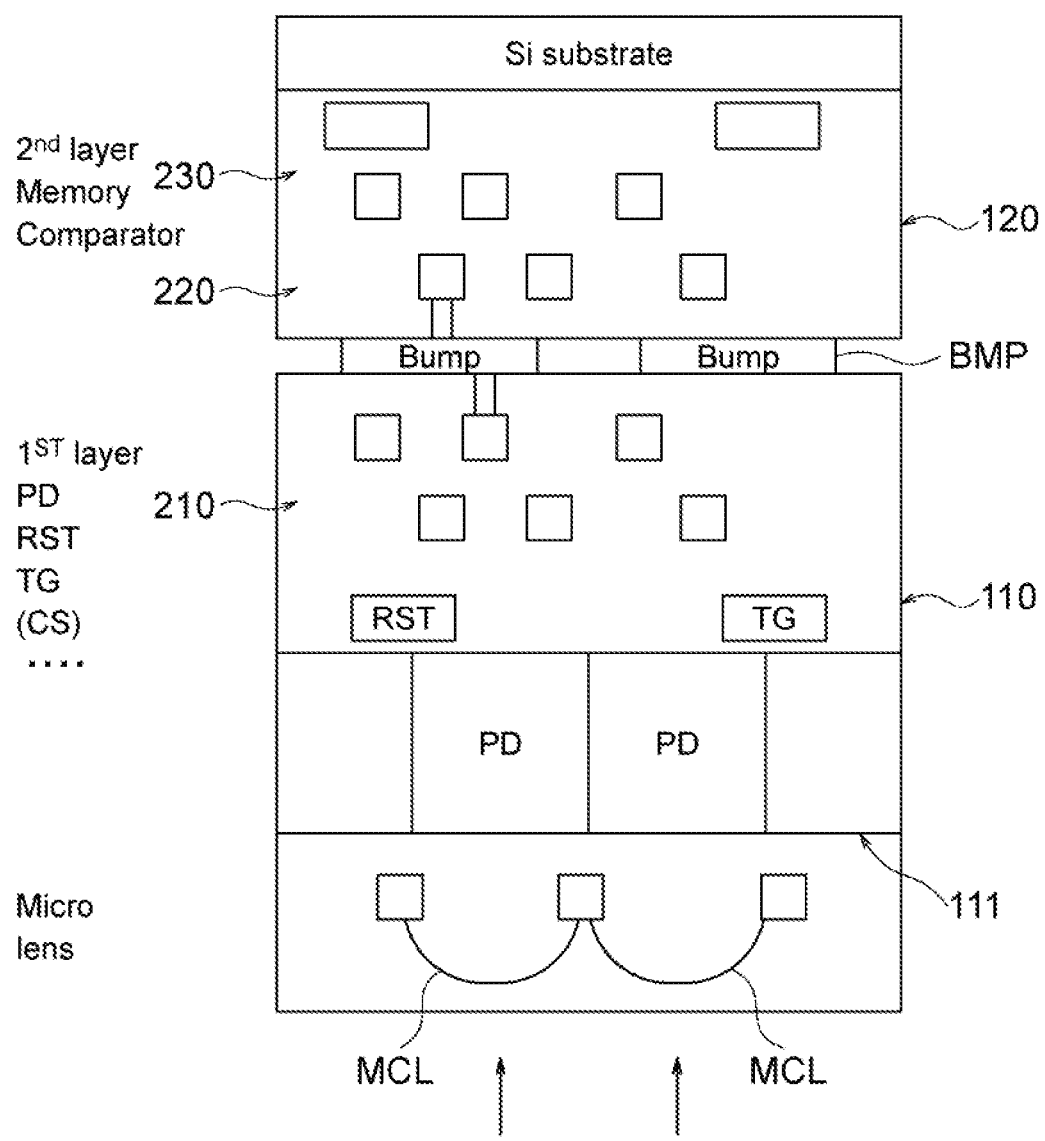
FIG. 8 is a schematic cross-sectional view for explaining the stacked structure of the solid-state imaging device according to the first embodiment.

FIG. 7A and FIG. 7B are schematic views for explaining the stacked structure of the solid-state imaging device 10 according to the first embodiment. FIG. 8 is a simple cross-sectional view for explaining the stacked structure of the solid-state imaging device 10 according to the first embodiment.

The solid-state imaging device 10 according to the first embodiment has a stacked structure of a first substrate (upper substrate) 110 and a second substrate (lower substrate) 120. The solid-state imaging device 10 is for example formed as an image capturing device having a stacked structure obtained by bonding the substrates to each other at a wafer level and cutting them by dicing. In the present example, the device has a structure of the first substrate 110 and the second substrate 120 which are stacked.

On the first substrate 110, the photoelectric converting and reading parts 210 of the digital pixels 200 in the pixel part 20 are formed centered about its center part. The photodiodes PD1 are formed on the first surface 111 side of the first substrate 110 which is the side where the light L is incident, while micro-lenses MCL and a color filter are formed on the light incident side. On the second surface side of the first substrate 110, the transfer transistor TG1-Tr, the reset transistor RST1-Tr, the source follower transistor SF1-Tr, the current transistor IC1-Tr, and the storage transistor CG1-Tr are formed.

In this way, in the first embodiment, basically the photoelectric converting and reading parts 210 of the digital pixels 200 are formed in a matrix on the first substrate 110.

On the second substrate 120, AD conversion parts 220 and memory parts 230 of the digital pixels 200 are formed in a matrix. Further, on the second substrate 120, the vertical scanning circuit 30, the output circuit 40, and the timing control circuit 50 may also be formed as well.

In such a stacked structure, the readout nodes ND2 of the photoelectric converting and reading parts 210 on the first substrate 110 and the inverted input terminals (−) of the comparators 221 in the digital pixels 200 on the second substrate 120 are individually electrically connected using the signal line LSGN1, micro bumps BMP, vias (die-to-die vias), and the like as shown in for example FIG. 3 and FIG. 4. Further, in the present embodiment, the readout nodes ND2 of the photoelectric converting and reading parts 210 on the first substrate 110 and the inverted input terminals (−) of the comparators 221 in the digital pixels 200 on the second substrate 120 are AC-coupled by coupling capacitors CC1.

Reading Operation of Solid-State Imaging Device 10

The characteristic configurations and functions of the parts in the solid-state imaging device 10 were explained above. Next, a reading operation etc. of the pixel signals of the digital pixels 200 in the solid-state imaging device 10 according to the first embodiment will be explained.

FIG. 9A to FIG. 9C and FIG. 10A and FIG. 10B are views showing operation sequences and potential transitions for mainly explaining the reading operation in the pixel part at the time of a predetermined shutter mode in the solid-state imaging device according to the first embodiment. FIG. 9A is a view for explaining the first conversion gain reset readout processing HCGRRD. FIG. 9B is a view for explaining a global shutter operation. FIG. 9C is a view for explaining the first conversion gain signal readout processing HCGSRD. FIG. 10A is a view for explaining the second conversion gain signal readout processing LCGSRD. FIG. 10B is a view for explaining the second conversion gain reset readout processing LCGRRD.

First, as shown in FIG. 9A, in the first reset period PR1, the reset transistors RST1-Tr as the reset elements in all pixels are held in a conductive state and the first conversion gain reset readout processing HCGRRD is executed. Note that, here, assume that the photodiodes PD1 are filled with the accumulated charges just before overflowing. In this case, under the control of the reading part 60, the first readout reset signal HCGVRST converted with the first conversion gain (high conversion gain: HUG) corresponding to the first charge amount of the floating diffusion FD1 is read out from the output buffer part 211. Further, the AD conversion processing with respect to the first readout reset signal HCGVRST is carried out in the comparator 221 and the AD conversion code with respect to the first readout reset signal HCGVRST is stored in the memory part 230. In this state, the analog CDS (auto zero) and digital CDS (AD conversion) are executed.

Next, as shown in FIG. 9B, after the AD conversion code with respect to the first readout reset signal HCGVRST is stored in the memory part, in the transfer period PT1, the transfer transistors TG1-Tr as the transfer elements in all pixels are held in a conductive state and the charges accumulated in the photodiodes PD1 as the photoelectric conversion element are transferred to the floating diffusions FD1 as the output nodes ND1. Further, the charges of a portion of the transferred charges are accumulated in the storage capacitors CS1 as the storage capacity elements. The floating diffusions FD1 as The output nodes ND1 and the storage capacitors CS1 as the storage capacity elements are used to execute the global shutter operation. In this way, the transfer transistors TG1-Tr in all digital pixels 200 are rendered the conductive state simultaneously and in parallel to guarantee the global shutter operation, and the signals thereof are held under the light-shielding region.

Further, under the control of the reading part 60, when reading each row, the first conversion gain signal readout processing HCGSRD, the second conversion gain signal readout processing LCGSRD, and the second conversion gain reset readout processing LCGRRD are executed.

Next, as shown in FIG. 9C, the first conversion gain signal readout processing HCGSRD is executed. During the execution period of the first conversion gain signal readout processing HCGSRD, the storage transistors CG1-Tr are held in a non-conductive state and the charge of the floating diffusion FD1 as the output node ND1 and the charge of the storage capacitor CS1 as the storage capacity element are separated. Due to this, the charge amount of the floating diffusion FD1 is held at the first charge amount. In this case, under the control of the reading part 60, in the readout period PRD subsequent to the transfer period PT1 after the first reset period PR1, the first readout signal HCGVSIG converted with the first conversion gain (HCG) corresponding to the first charge amount of the floating diffusion FD1 as the output node ND1 is read out from the output buffer part 211. Further, the AD conversion processing with respect to the first readout signal HCGVSIG is carried out in the comparator 221.

Next, as shown in FIG. 10A, the second conversion gain signal readout processing LCGSRD is executed. During the execution period of the second conversion gain signal readout processing LCGSRD, the storage transistor CG1-Tr is held in a conductive state and the charge of the floating diffusion FD1 as the output node ND1 and the charge of the storage capacitor CS1 as the storage capacity element are joined (added). Due to this, the charge amount of the floating diffusion FD1 is held at the second charge amount. In this case, under the control of the reading part 60, from the output buffer part 211, the second readout signal LCGVSIG converted with the second conversion gain (low conversion gain: LCG) corresponding to the second charge amount obtained by combining the storage capacitor CS1 as the charge of the storage capacity element with the charge of the floating diffusion as the output node ND1 is read out. Further, the AD conversion processing with respect to the second readout signal LCGVSIG is carried out in the comparator 221.

Next, as shown in FIG. 10B, the second conversion gain reset readout processing LCGRRD is executed. During the execution period of the second conversion gain reset readout processing LCGRRD the storage transistor CG1-Tr is held in a conductive state, the reset transistor RST1-Tr as the reset element is held in a conductive state, and the charge of the floating diffusion FD1 as the output node ND1 and the charge of the storage capacitor CS1 as the storage capacity element are cleared. In this case, under the control of the reading part 60, in the second reset period PR2, the second readout reset signal LCGVRST converted with the second conversion gain (LCG) corresponding to the second charge amount is read out from the output buffer part 211. Further, the AD conversion processing with respect to the second readout reset signal LCGVSIG is carried out in the comparator 221.

Further, the read out signal is executed by reading the digital signal data from the memory node. It has such an MIPI data format and is, for example, sent to the outside of the solid-state imaging device 10 (image sensor) through the 10 buffer of the output circuit 40. This operation is globally executed with respect to the entire pixel array.

As explained above, according to the first embodiment, the solid-state imaging device 10 is configured as for example a stacked type CMOS image sensor which, in the pixel part 20, includes digital pixels comprised of photoelectric converting and reading parts 210, AD conversion parts 220, and memory parts 230 and has a global shutter operation function. In the solid-state imaging device 10 according to the first embodiment, each digital pixel 200 has an AD conversion function, and the AD conversion part 220 has the comparator 221 performing the AD conversion processing comparing the voltage signal read out by the photoelectric converting and reading part 210 and the reference voltage and outputting the digitalized comparison result signal. Further, the reading part 60 in the solid-state imaging device 10 according to the first embodiment can perform, in the first reset period PR1, the first conversion gain reset readout processing HCGRRD reading the first readout reset signal HCGVRST converted with the first conversion gain (for example high conversion gain: HCG) corresponding to the first charge amount of the floating diffusion FD from the output buffer part 211 and performing the AD conversion processing with respect to the first readout reset signal HCGVRST in the comparator. Further, the reading part 60, in the readout period PRD subsequent to the first transfer period PT1 after the first reset period PR1, can perform the first conversion gain signal readout processing HCGSRD reading the first readout signal HCGVSIG converted with the first conversion gain (HCG) corresponding to the first charge amount of the floating diffusion FD from the output buffer part 211 and performing the AD conversion processing with respect to the first readout signal HCGVSIG in the comparator. Further, the reading part 60 can perform the second conversion gain signal readout processing LCGSRD reading, from the output buffer part 211, the second readout signal LCGVSIG converted with the second conversion gain (low conversion gain: LCG) corresponding to the second charge amount obtained by combining the charge of the storage capacitor CS1 with the charge of the floating diffusion FD and performing the AD conversion processing with respect to the second readout signal LCGVSIG in the comparator. Further, the reading part 60, in the second reset period PR2, can perform the second conversion gain reset readout processing LCGRRD reading the second readout reset signal LCGVRST converted with the second conversion gain (LCG) corresponding to the second charge amount from the output buffer part 211 and performing the AD conversion processing with respect to the second readout reset signal LCGVRST in the comparator. Further, the reading part 60 in the first embodiment stores only the data (AD conversion code) after the AD conversion processing in the comparator in the first conversion gain reset readout processing HCGRRD in the memory part.

The reading part 60 in the first embodiment, in the first reset period PR1, holds the reset transistors as the reset elements in all pixels in a conductive state to execute the first conversion gain reset readout processing HCGRRD and stores the AD conversion code with respect to the first readout reset signal HCGVRST in the memory part. After that, in the transfer period PT1, it holds the transfer transistors as the transfer elements in all pixels in the conductive state to transfer the charges accumulated in the photodiodes PD1 to the floating diffusions FD1 and executes the global shutter operation making the storage capacitors CS1 as the storage capacity elements accumulate the overflowed charges. Further, the reading part 60 in the first embodiment, when reading each row, executes the first conversion gain signal readout processing HCGSRD, the second conversion gain signal readout processing LCGSRD, and the second conversion gain reset readout processing LCGRRD in the described order.

Accordingly, according to the solid-state imaging device 10 in the first embodiment, it becomes possible to realize digital pixels provided with the global shutter function at a small pixel pitch. Due to this, the digital pixels can simultaneously achieve a broad dynamic range, high sensitivity, low noise, and high frame rate, therefore it becomes possible to apply this as the pixel architecture for the global shutter technique. Further, according to the first embodiment, it is possible to substantially realize a broader dynamic range and a higher frame rate and in addition possible to lower noise, possible to expand the effective pixel region to the maximum limit, and possible to raise the value relative to the cost to the maximum limit.

Further, according to the solid-state imaging device 10 of the first embodiment, it is possible to prevent complication of the configuration while preventing a drop in the area efficiency in layout.

Further, the solid-state imaging device 10 according to the first embodiment has a stacked structure of the first substrate (upper substrate) 110 and second substrate (lower substrate) 120. Accordingly, in the first embodiment, basically, by forming the substrate 110 side by only the NMOS system elements and by expanding the effective pixel region to the maximum limit by the pixel array, the value relative to the cost can be raised to the maximum limit.

Second Embodiment

Figures 11A, 11B:
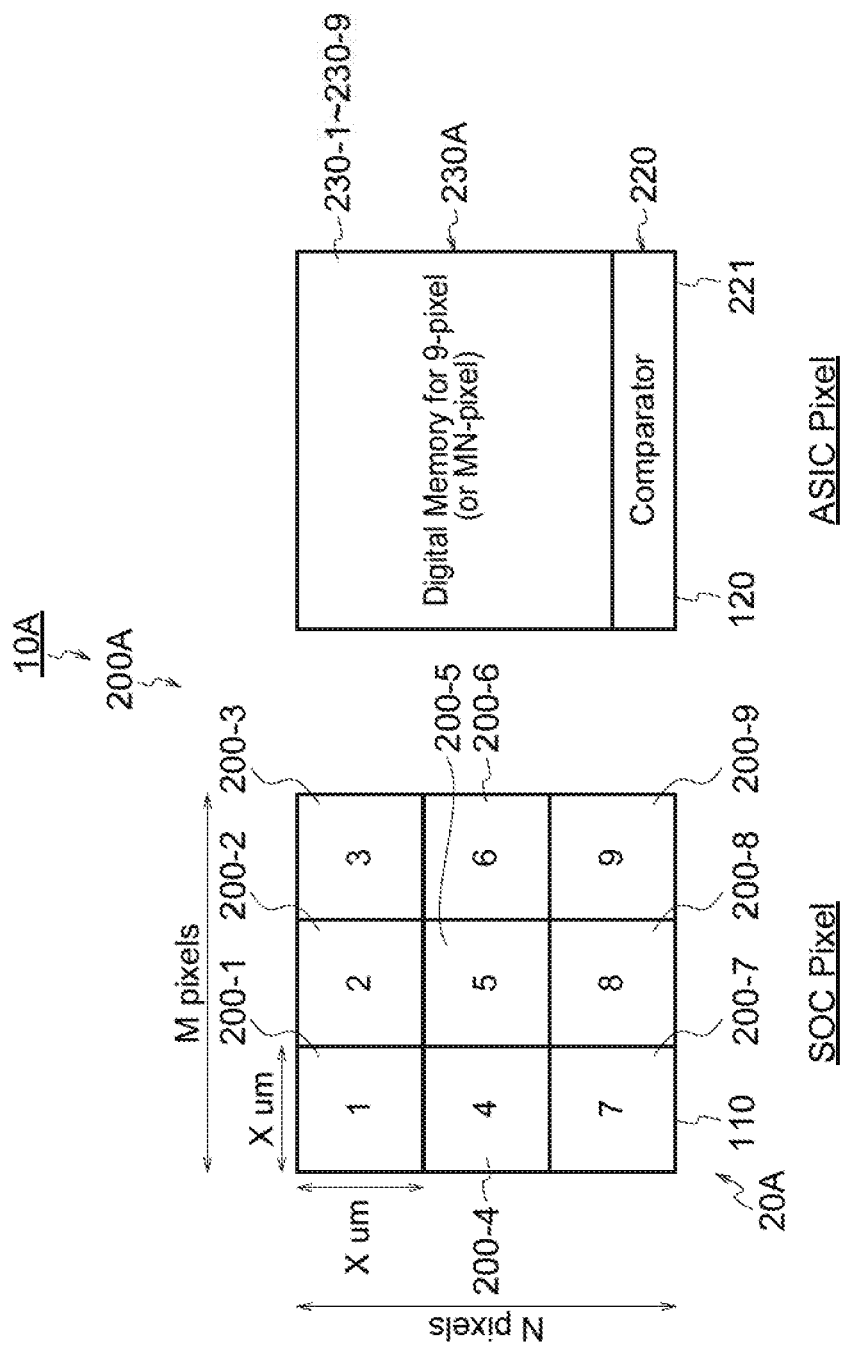
FIG. 11A and FIG. 11B are block diagrams showing an example of the configuration of the digital pixel in a solid-state imaging device according to a second embodiment of the present invention.
Figure 13:
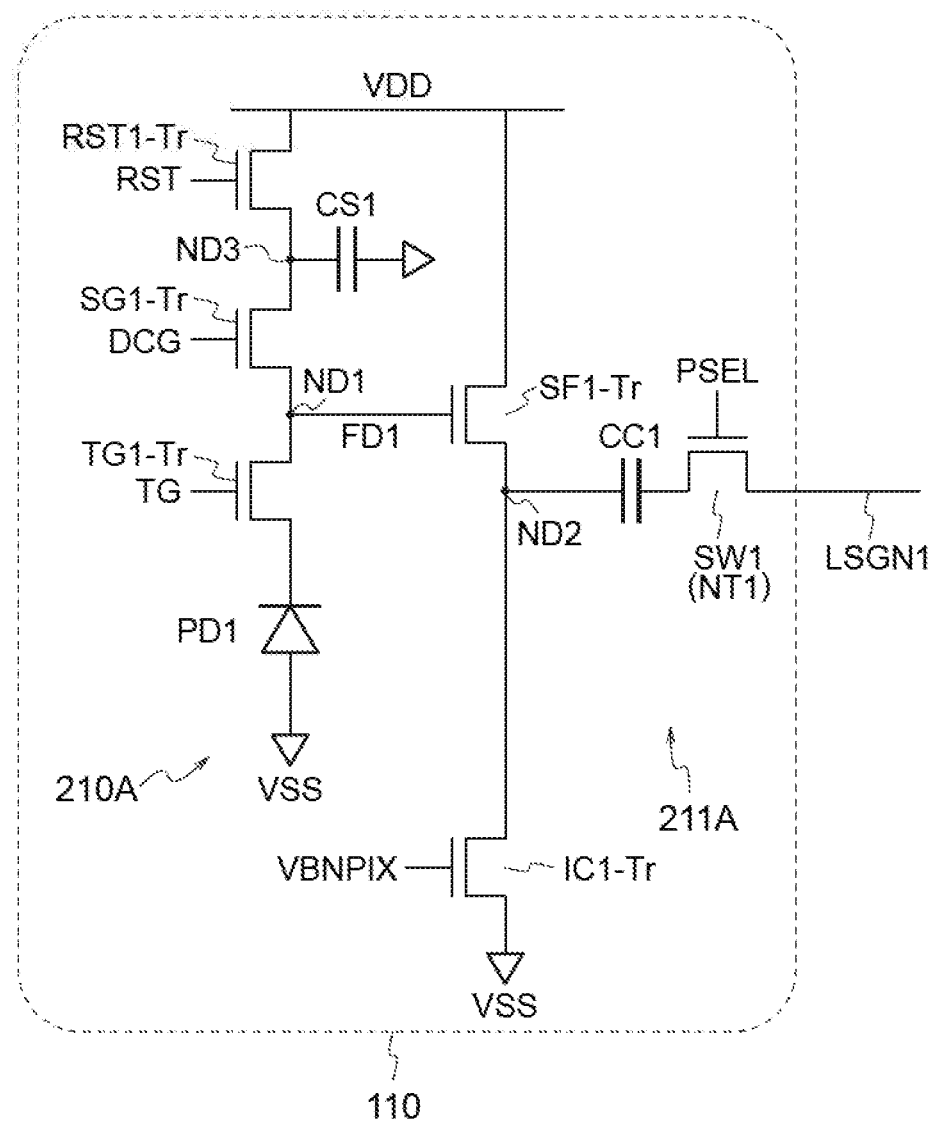
FIG. 13 is a circuit diagram showing an example of the configuration of a photoelectric converting and reading part in the digital pixel according to the second embodiment of the present invention.
Figure 14:
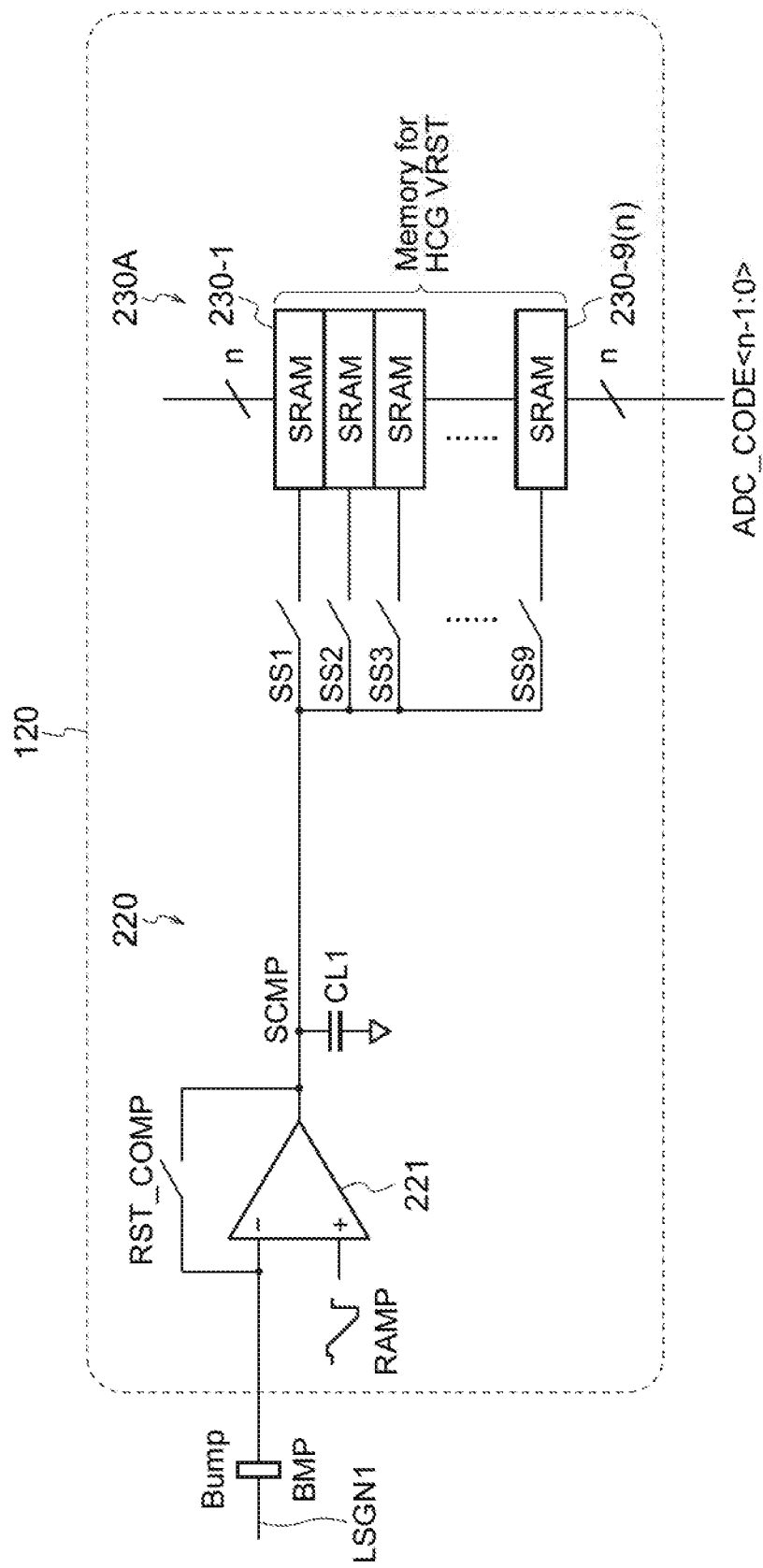
FIG. 14 is a circuit diagram showing an example of the configurations of an AD conversion part and a memory part in the digital pixel according to the second embodiment of the present invention.

FIG. 11A and FIG. 11B are block diagrams showing an example of the configuration of a digital pixel in a solid-state imaging device according to a second embodiment of the present invention. FIG. 12 is a circuit diagram showing an example of the configuration of the digital pixel according to the second embodiment of the present invention. FIG. 13 is a circuit diagram showing an example of the configuration of a photoelectric converting and reading part in the digital pixel according to the second embodiment of the present invention. FIG. 14 is a circuit diagram showing an example of the configurations of an AD conversion part and a memory part in the digital pixel according to the second embodiment of the present invention.

The difference of a solid-state imaging device 10A according to the second embodiment from the solid-state imaging device 10 according to the first embodiment explained above is as follows. In the solid-state imaging device 10A according to the second embodiment, one comparator 221 is shared by a plurality of sharing pixels 200-1 to 200-n. In the example in FIG. 12 and FIG. 13, for simplification of the drawings, nine digital pixels 200-1 to 200-9 are arranged in a matrix comprised of 3 rows and 3 columns (matrix where M=3 and N=3).

The plurality of sharing pixels 200-1 to 200-9 share one comparator 221. Therefore, as shown in FIG. 12 and FIG. 13, an output buffer part 211A of a photoelectric converting and reading part 210A has a switch element SW1 connected between the coupling capacitor CC1 and the first input terminal of the comparator 221. The switch element SW1 is formed by for example an n-channel MOS (NMOS) transistor NT1. Further, on the output side of the comparator 211, as shown in FIG. 13 and FIG. 14, corresponding to the sharing pixels 200-1 to 200-9, a plurality of memory parts 230-1 to 230-9 are connected in parallel through switch elements 551 to 559.

Figure 15:
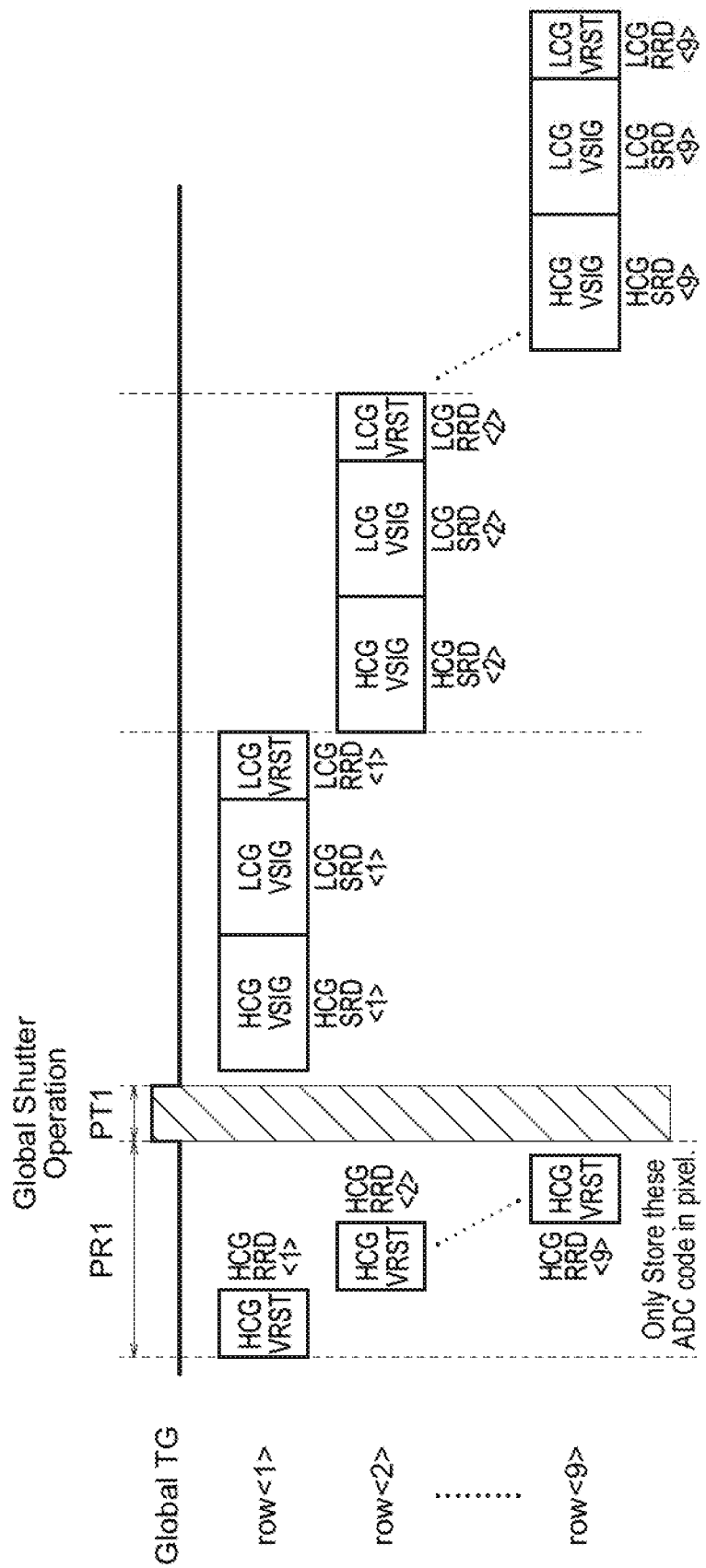
FIG. 15 is a view showing a first example of a read out sequence of sharing digital pixels in the solid-state imaging device according to the second embodiment of the present invention.

FIG. 15 is a view showing a first example of a read out sequence of the sharing digital pixels 200-1 to 200-9 in the solid-state imaging device 10A according to the second embodiment of the present invention.

In the example in FIG. 15, the reading part 60, in order to perform the analog CDS (auto zero), in the first reset period PR1, holds the reset transistors RST1-Tr as the reset elements in the sharing pixels 200-1 to 200-9 in the conductive state, executes the first conversion gain reset readout processings HCGRRD <1> to <9> for each row in order, and stores the AD conversion codes with respect to the first readout reset signals HCGVRST in the memory parts 230-1 to 230-9. Further, after individually storing the AD conversion codes with respect to the first readout reset signals HCGVRST in the memory parts 230-1 to 230-9, in the transfer period PT1, the transfer transistors TG1-Tr as the transfer elements in all pixels are held in the conductive state, and the charges accumulated in the photodiodes PD1 as the photoelectric conversion elements are transferred to the floating diffusions FD1 as the output nodes ND1 to thereby execute the global shutter operation making the storage capacitors CS1 as the storage capacity elements accumulate the overflowed charges. Further, the reading part 60, when reading each row, executes the first conversion gain signal readout processing HCGSRD, the second conversion gain signal readout processing LCGSRD, and the second conversion gain reset readout processing LCGRRD in the described order.

Figure 16:
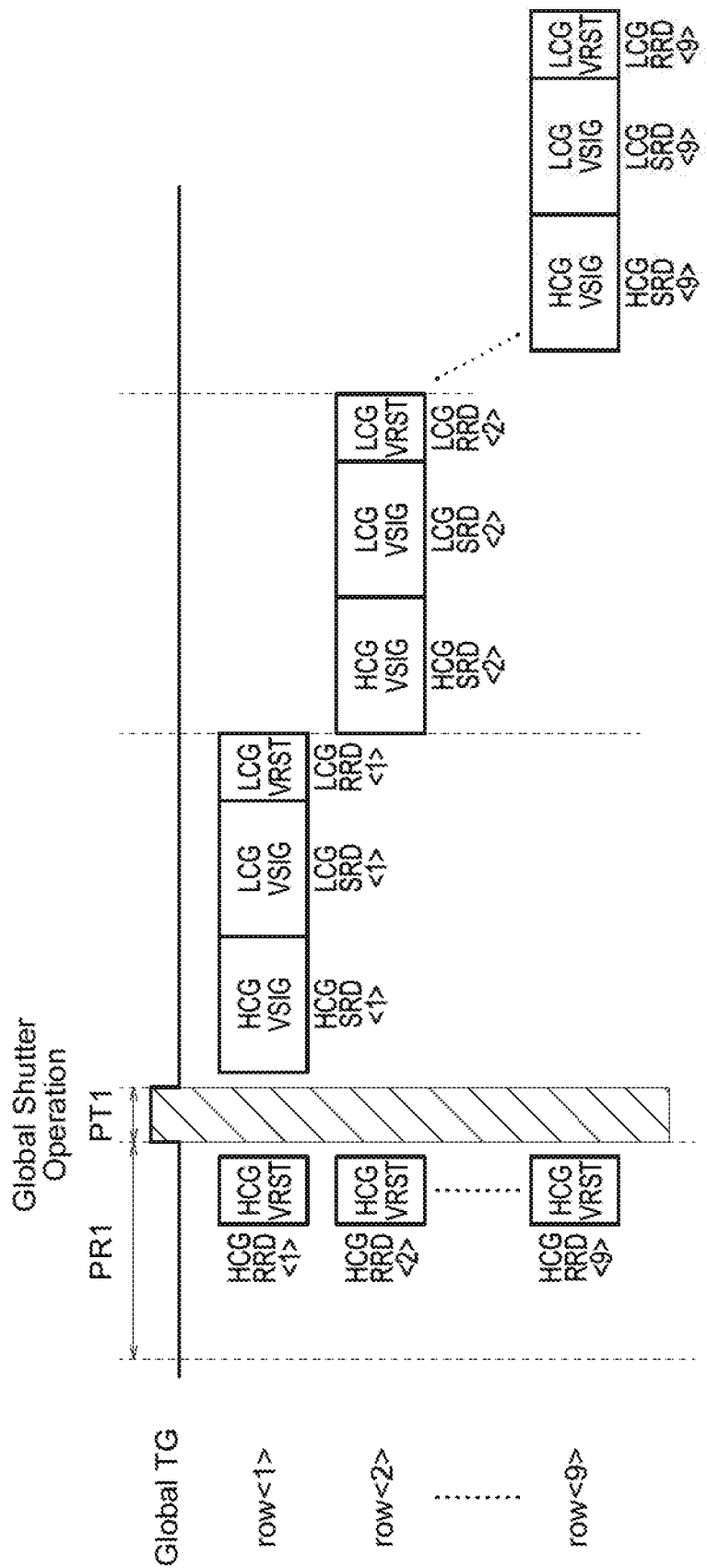
FIG. 16 is a view showing a second example of the read out sequence of sharing digital pixels in the solid-state imaging device according to the second embodiment of the present invention.

FIG. 16 is a view showing a second example of the read out sequence of the sharing digital pixels 200-1 to 200-9 in the solid-state imaging device 10A according to the second embodiment of the present invention.

In the example in FIG. 16, the reading part 60, in order to perform the analog CDS (auto zero), in the first reset period PR1, holds the reset transistors RST1-Tr as the reset elements in all of the sharing pixels 200-1 to 200-9 in the conductive state, executes the first conversion gain reset readout processings HCGRRD <1> to <9> in all rows simultaneously and in parallel, and individually stores the AD conversion codes with respect to the first readout reset signals HCGVRST in the memory parts 230-1 to 230-9. Further, after individually storing the AD conversion codes with respect to the first readout reset signals HCGVRST in the memory parts 230-1 to 230-9, in the transfer period PT1, it holds the transfer transistors TG1-Tr as the transfer elements in all pixels in the conductive state to transfer the charges accumulated in the photodiodes PD1 as the photoelectric conversion elements to the floating diffusions FD1 as the output nodes ND1 to thereby execute the global shutter operation accumulating the overflowed charges in the storage capacitors CS1 as the storage capacity elements. Further, the reading part 60, when reading each row, executes the first conversion gain signal readout processing HCGSRD, the second conversion gain signal readout processing LCGSRD, and the second conversion gain reset readout processing LCGRRD in the described order.

Figure 17:
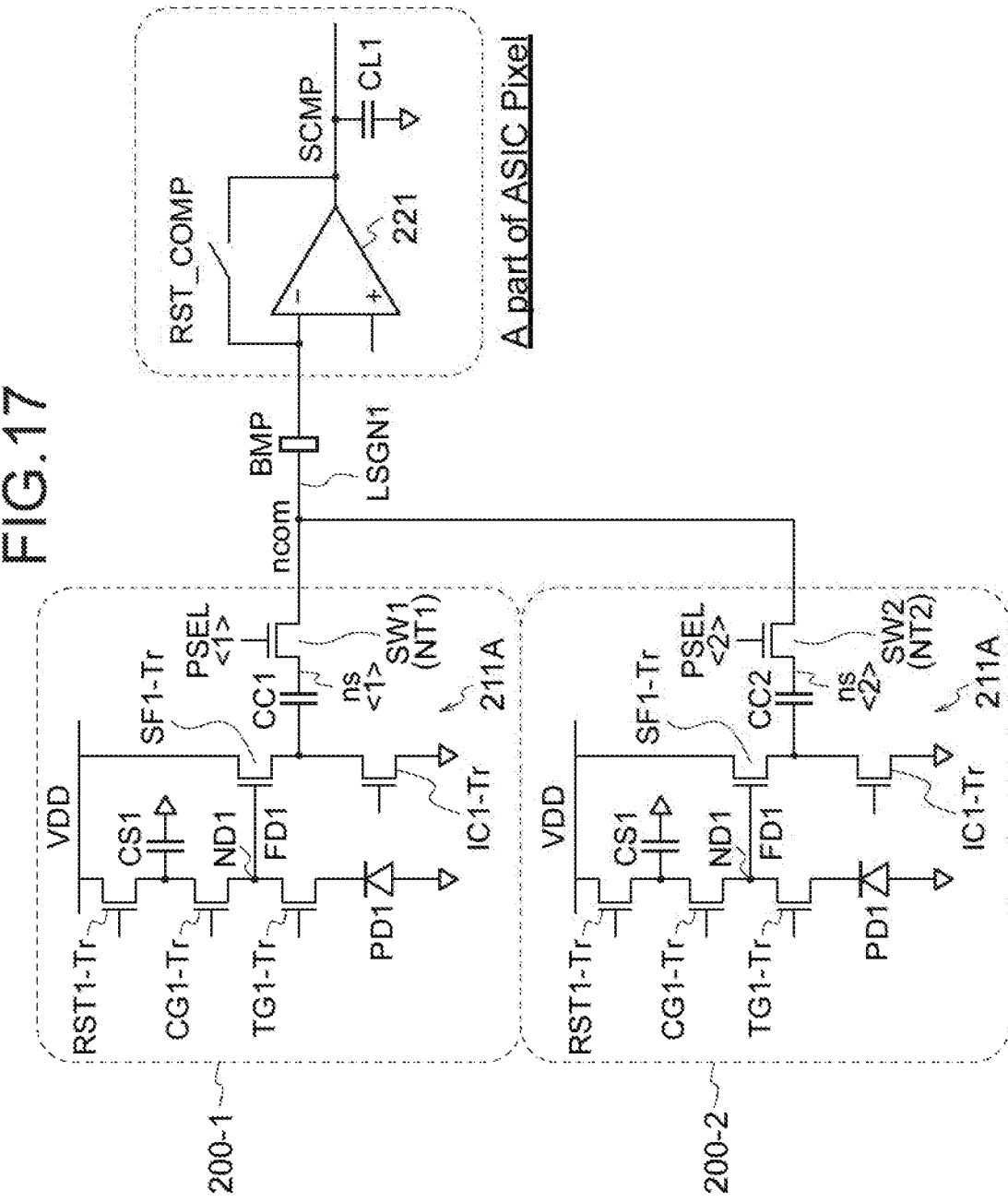
FIG. 17 is a circuit diagram showing an example of the configuration of a digital pixel according to the second embodiment of the present invention and is a circuit diagram showing an example of the configuration of two photoelectric converting and reading parts sharing one comparator.
Figure 18:
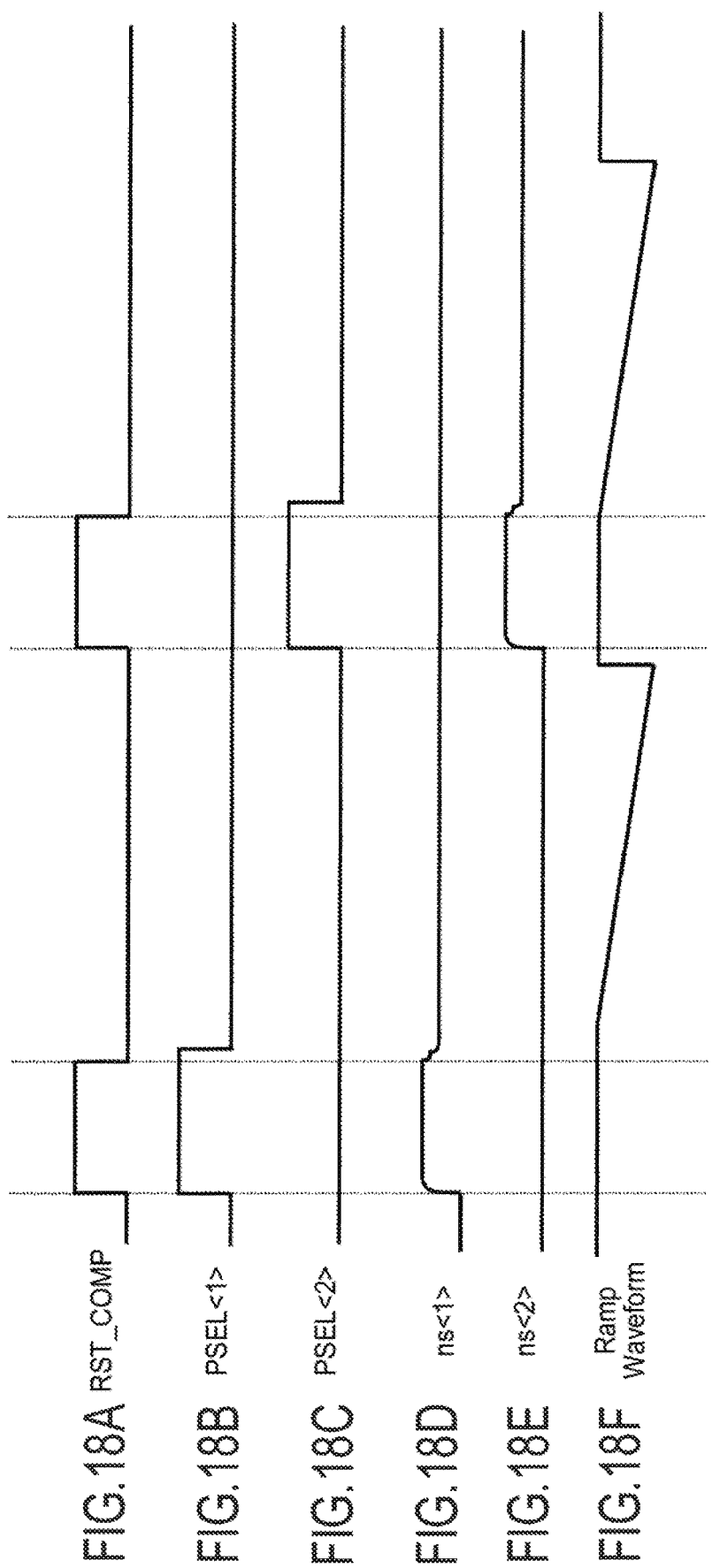
FIG. 18A to FIG. 18F are timing charts showing an example of a reading operation of the digital pixels in FIG. 17.

FIG. 17 is a circuit diagram showing an example of the configuration of the digital pixel according to the second embodiment of the present invention and is a circuit diagram showing an example of the configuration of two photoelectric converting and reading parts 210A sharing one comparator 221. FIG. 18A to FIG. 18F are timing charts showing an example of the reading operation of the digital pixels in FIG. 17.

In the example in FIG. 17, as explained above, in the output buffer part 211A, NMOS transistors NT1 and NT2 as switch elements SW1 and SW2 are added to the signal line LSGN1 side of the coupling capacitor CC1 for AC coupling and the coupling capacitor CC1 for AC coupling is selectively connected to and disconnected from the first input terminal of the minus terminal (virtual ground) of the comparator 221 in response to control signals PSEL<1> and PSEL<2>. The offset accompanied by noise applied after auto zero is preserved in the nodes ns<1> and ns<2>.

According to the second embodiment, not only can the same effect as the effect by the first embodiment be obtained, but also it becomes possible to realize digital pixels provided with the global shutter function at a further smaller pixel pitch and it becomes possible to lower the power consumption.

Third Embodiment

Figure 19:
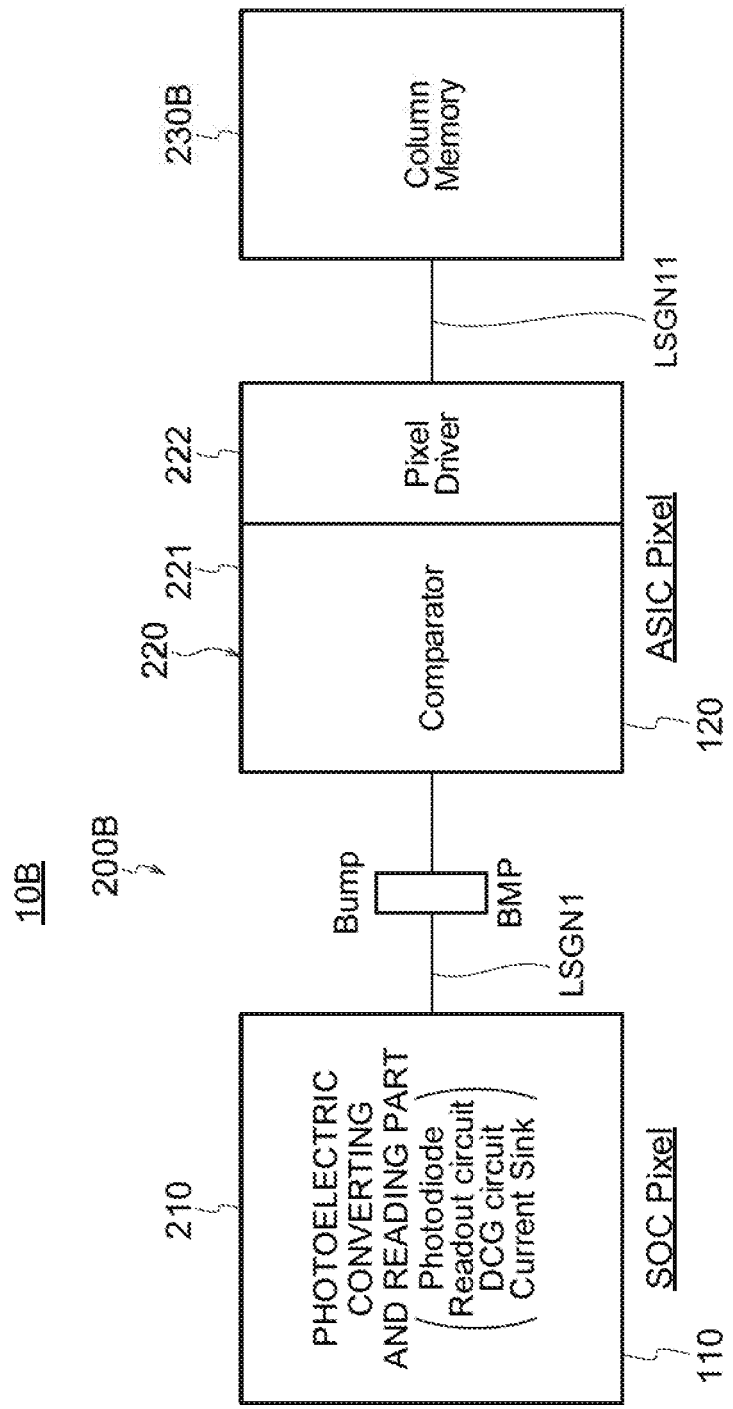
FIG. 19 is a block diagram showing an example of the configuration of a digital pixel in a solid-state imaging device according to a third embodiment of the present invention.
Figure 20:
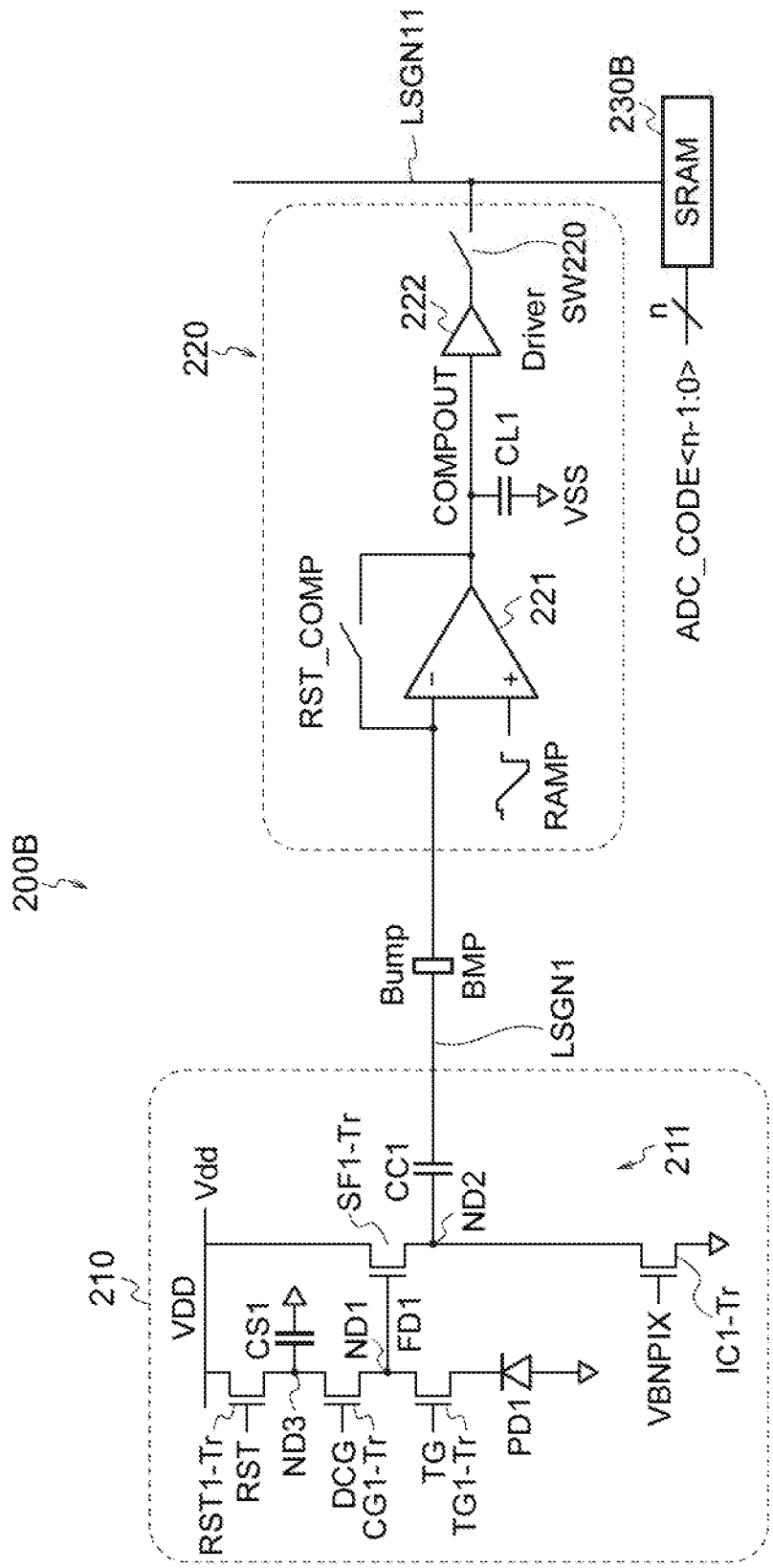
FIG. 20 is a circuit diagram showing an example of the configuration of the digital pixel according to the third embodiment of the present invention.
Figure 21:
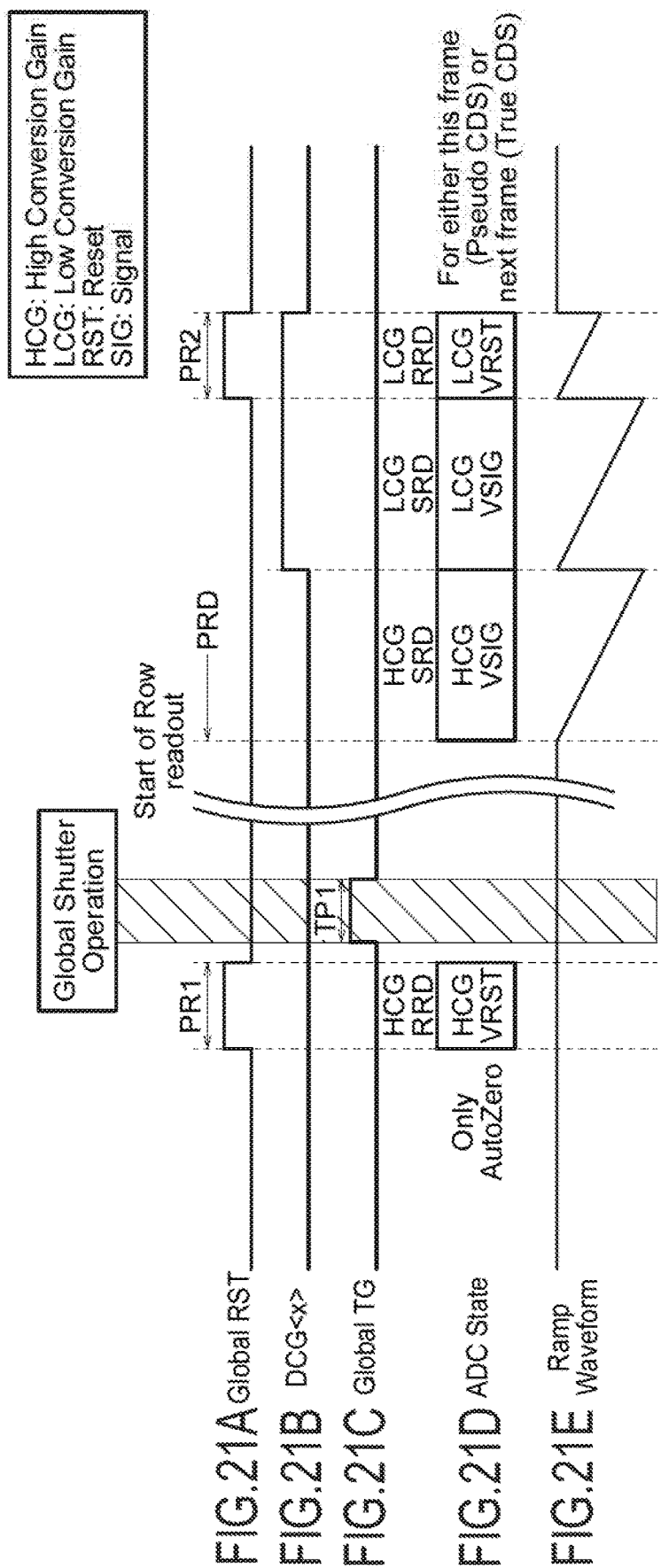
FIG. 21A to FIG. 21E are views showing an example of a read out sequence of the digital pixels in the solid-state imaging device according to the third embodiment of the present invention.

FIG. 19 is a block diagram showing an example of the configuration of a digital pixel in a solid-state imaging device according to a third embodiment of the present invention. FIG. 20 is a circuit diagram showing an example of the configuration of the digital pixel according to the third embodiment of the present invention The difference of a solid-state imaging device 10B according to the third embodiment from the solid-state imaging device 10 according to the first embodiment explained above is as follows. In the solid-state imaging device 10B according to the third embodiment, the output of the comparator 221 is connected to a vertical signal line LSGN11 laid in units of columns, while a memory part 230B is arranged in units of columns and is connected to the vertical signal line LSGN11.

In the example in FIG. 19, a driver 222 and switch element SW220 are connected between the output side of the comparator 221 and the vertical signal line LSGN11.

The output of the comparator 221 is sent to the memory part 2303 corresponding to the column at the latch timing of the AD conversion code.

FIG. 21A to FIG. 21E are views showing an example of the read out sequence of digital pixels 200 in the solid-state imaging device 10B according to the third embodiment of the present invention.

In this case as well, the reading part 60, in the readout control of the pixel signals from the digital pixels 200, executes the analog CDS (auto zero) and digital CDS (AD conversion) in both of the readout signal according to the high conversion gain HCG and the readout signal according to the low conversion gain LCG. However, in the memory part 230, only the data (AD conversion code) after the AD conversion processing in the comparator in the first conversion gain reset readout processing HCGRRD is stored. In the case of reading each row, the AD conversion processings of the remaining first conversion gain signal readout processing HCGSRD, the second conversion gain signal readout processing LCGSRD, and the second conversion gain reset readout processing LCGRRD are executed. Due to this, it becomes possible to lower the necessity of the digital memory in the digital pixel 200 and becomes possible to remove unnecessary memory. Concerning this point, while the CDS in the reading operation according to the high conversion gain HCG is true CDS, the MS in the reading operation according to the low conversion gain LCG may be a pseudo CBS if it is used in this frame. In this case, reset noise is removed with respect to the reading operation according to the high conversion gain HCG. This means that only the DC fluctuation is removed with respect to the reading operation according to the low conversion gain LCG.

Contrary to this, at the joining point, when storing the AD conversion code with respect to the second readout reset signal LCGVRST according to the second conversion gain reset readout processing LCGRRD in the memory part 230 and the code is used for the next frame, a true CDS operation is realized for the reading operation by the low conversion gain LCG.

According to the third embodiment, not only can the same effect as the effect by the first embodiment explained above be obtained, but also it is possible to reduce the area necessary for the memory (SRAM in the present example) bits, possible to improve the area efficiency of the comparator 221, possible to realize digital pixels provided with the global shutter function at a further smaller pixel pitch, and possible to lower the power consumption.

Fourth Embodiment

Figure 22:
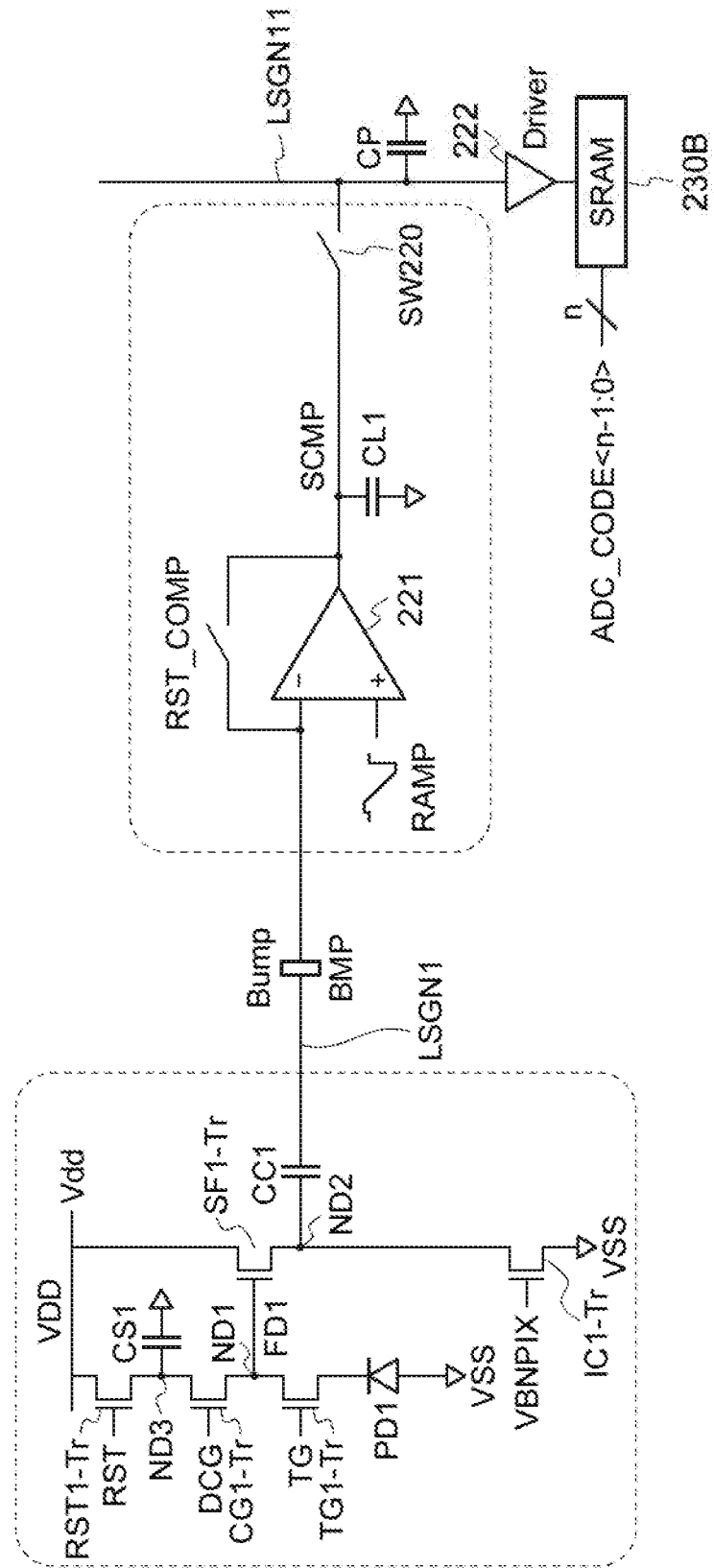
FIG. 22 is a circuit diagram showing an example of the configuration of a digital pixel according to a fourth embodiment of the present invention.

FIG. 22 is a circuit diagram showing an example of the configuration of a digital pixel according to a fourth embodiment of the present invention.

The difference of a solid-state imaging device 10C according to the fourth embodiment from the solid-state imaging device 103 according to the third embodiment explained above is as follows. In the solid-state imaging device 10C according to the fourth embodiment, the output of the comparator 221 is connected through the switch element SW220 to the vertical signal line LSGN11 interconnected in units of columns, and the driver 222 is connected to the vertical signal line LSGN11 on the input side of the memory part 230B.

In the fourth embodiment, the comparator 221 uses a parasitic capacitance CP of the vertical signal line LSGN11 in order to narrow the noise bandwidth.

According to the fourth embodiment, the same effect as the effects by the first and third embodiments can be obtained.

The solid-state imaging devices 10, 10A, 10B, and 10C explained above can be applied, as image capturing devices, to digital cameras, video cameras, portable terminals, or monitoring cameras, cameras for medical endoscopes, and other electronic apparatuses.

Figure 23:
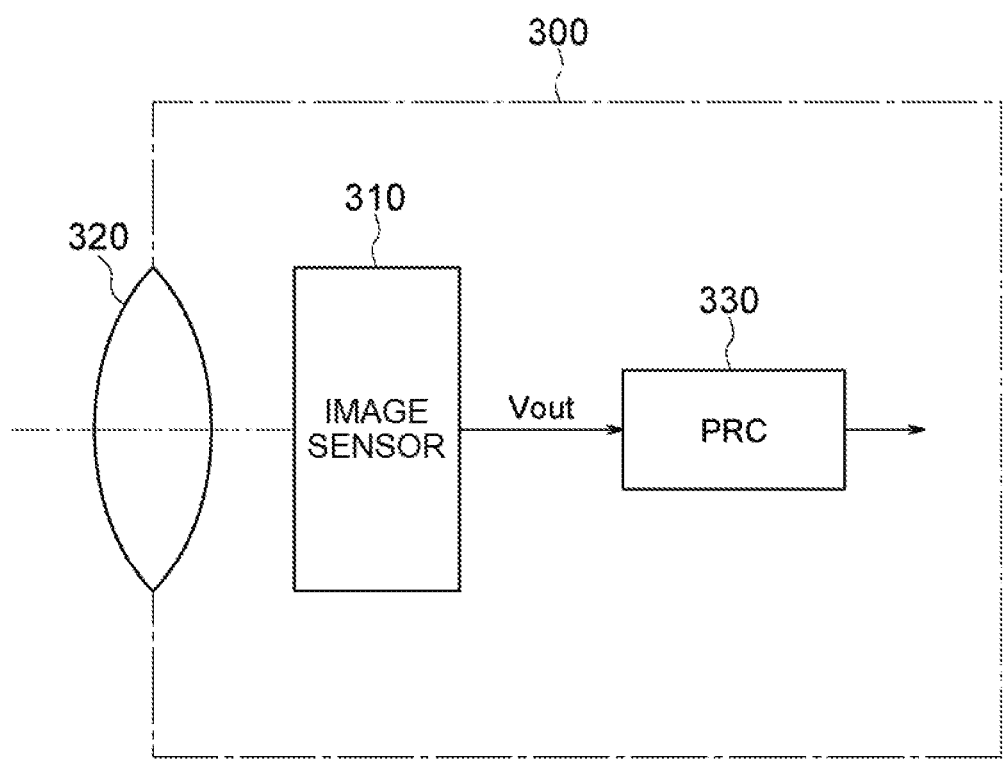
FIG. 23 is a view showing an example of the configuration of an electronic apparatus to which the solid-state imaging device according to an embodiment of the present invention is applied.

FIG. 23 is a view showing an example of the configuration of an electronic apparatus mounting a camera system to which the solid-state imaging device according to an embodiment of the present invention is applied.

The electronic apparatus 300, as shown in FIG. 23, has a CMOS image sensor 310 to which the solid-state imaging device 10 according to the present embodiment can be applied. Further, the electronic apparatus 300 has an optical system (lens etc.) 320 which guides incident light (forms a subject image) into a pixel region of this CMOS image sensor 310. The electronic apparatus 300 has a signal processing circuit (PRC) 330 for processing the output signals of the CMOS image sensor 310.

The signal processing circuit 330 applies predetermined signal processing with respect to the output signals of the CMOS image sensor 310. The lineage signal processed in the signal processing circuit 330 can be projected as a moving image onto a monitor formed by a liquid crystal display or the like or can be output to a printer. Further, it can be directly recorded in a recording medium such as a memory card. Various embodiments are possible.

As explained above, by mounting the solid-state imaging devices 10, 10A, 10B, and 10C explained before as the CMOS image sensors 310, it becomes possible to provide high performance, small-sized, and low-cost camera systems. Further, it is possible to realize for example monitoring cameras or cameras for medical endoscopes or other electronic apparatuses which are used for applications where there are restrictions in mounting size, number of connectable cables, cable length, installation height, etc. in requirements for camera installation.

What is claimed is:

1. A solid-state imaging device, comprising
a pixel part in which pixels for performing photoelectric conversion are arranged and
a reading part which reads out pixel signals from the pixel part, wherein
each pixel includes
a photoelectric conversion element which accumulates a charge generated by photoelectric conversion in an integration period,
a transfer element capable of transferring the charge accumulated in the photoelectric conversion element in a transfer period after the integration period,
an output node to which the charge accumulated in the photoelectric conversion element is transferred through the transfer element,
a storage element connected to the output node,
a storage capacity element which accumulates the charge at the output node through the storage element,
a reset element which resets the output node to a predetermined potential in a reset period,
an output buffer part which converts the charge at the output node to a voltage signal with a gain corresponding to a quantity of the charge and outputs the converted voltage signal,
a comparator which performs an analog-to-digital (AD) conversion processing for comparing the voltage signal of the output buffer part and a reference voltage and outputting a digitalized comparison result signal, and
a memory part storing data corresponding to the comparison result signal of the comparator,
the reading part is capable of performing:
in a first reset period, a first conversion gain reset readout processing for reading from the output buffer part a first readout reset signal converted with a first conversion gain corresponding to a first charge amount of the output node and performing the AD conversion processing with respect to the first readout reset signal in the comparator;
in a readout period subsequent to the transfer period after the first reset period, a first conversion gain signal readout processing for reading from the output buffer part a first readout signal converted with the first conversion gain corresponding to the first charge amount of the output node and performing the AD conversion processing with respect to the first readout signal in the comparator;
a second conversion gain signal readout processing reading, from the output buffer part, a second readout signal converted with a second conversion gain corresponding to a second charge amount obtained by combining the charge of the storage capacity element with the charge at the output node and performing the AD conversion processing with respect to the second readout signal in the comparator; and
in a second reset period, a second conversion gain reset readout processing for reading from the output buffer part a second readout reset signal converted with a second conversion gain corresponding to the second charge amount and performing the AD conversion processing with respect to the second readout reset signal in the comparator, and
stores in the memory part the data output by the AD conversion processing of the comparator in the first conversion gain reset readout processing.

2. The solid-state imaging device according to claim 1, wherein:
the pixels in the pixel part are arranged in a matrix,
the reading part,
in the first reset period, holds the reset elements in all pixels in a conductive state and executes the first conversion gain reset readout processing to store an AD conversion code with respect to the first readout reset signal in the memory part, and then,
in the transfer period, holds the transfer elements in all pixels in the conductive state to transfer the charges accumulated in the photoelectric conversion elements to the output nodes to thereby execute a global shutter operation for accumulating overflowed charges in the storage capacity elements, and
when reading each row,
executes the first conversion gain signal readout processing, the second conversion gain signal readout processing, and the second conversion gain reset readout processing in this order.

3. The solid-state imaging device according to claim 2, wherein:
the reading part executes the first conversion gain signal readout processing by holding the storage element in a non-conductive state and separating the charge of the output node and the charge of the storage capacity element,
executes the second conversion gain signal readout processing by holding the storage element in the conductive state and combining the charge of the output node and the charge of the storage capacity element, and
executes the second conversion gain reset readout processing by holding the reset element and the storage element in the conductive state and clearing the charge of the output node and the charge of the storage capacity element.

4. The solid-state imaging device according to claim 2, wherein:
the reading part, for a next frame, can store in the memory part an AD conversion code with respect to the second readout reset signal according to the second conversion gain reset readout processing.

5. The solid-state imaging device according to claim 1, wherein:
each pixel includes a floating diffusion as the output node and
the output buffer part includes
a source follower element which converts the charge of the floating diffusion to a voltage signal corresponding to a quantity of the charge and outputs the converted signal,
a current source connected to a source of the source follower element, and
a readout node which is formed by a connection part of the source of the source follower element and the current source and is connected to one input terminal of the comparator.

6. The solid-state imaging device according to claim 5, wherein:
in the comparator, a first input terminal is connected to the readout node of the output buffer part and is supplied with the voltage signal by the output buffer part, and
a second input terminal is supplied with the reference voltage, and
a coupling capacitor is connected between the readout node of the output buffer part and the first input terminal of the comparator.

7. The solid-state imaging device according to claim 1, wherein:
a plurality of sharing pixels share one comparator.

8. The solid-state imaging device according to claim 7, wherein:
the reading part,
in the first reset period, holds the reset elements in all pixels in a conductive state and executes the first conversion gain reset readout processing for each row in order, individually stores the AD conversion codes with respect to the first readout reset signals in the memory parts, and then,
in the transfer period, holds the transfer elements in all pixels in the conductive state to transfer the charges accumulated in the photoelectric conversion elements to the output nodes to thereby execute the global shutter operation for accumulating the overflowed charges in the storage capacity elements.

9. The solid-state imaging device according to claim 7, wherein:
the reading part,
in the first reset period, holds the reset elements in all pixels in the conductive state and executes the first conversion gain reset readout processings in all rows simultaneously and in parallel, and individually stores the AD conversion codes with respect to the first readout reset signals in the memory parts, and then,
in the transfer period, holds the transfer elements in all pixels in the conductive state to transfer the charges accumulated in the photoelectric conversion elements to the output nodes to thereby execute the global shutter operation for accumulating the overflowed charges in the storage capacity elements.

10. The solid-state imaging device according to claim 7, wherein:
in the comparator,
a first input terminal is connected to the readout node of the output buffer part and is supplied with the voltage signal by the output buffer part, and
a second input terminal is supplied with the reference voltage,
each of the sharing pixels includes
a floating diffusion as the output node, and
the output buffer part includes
a source follower element which converts the charge of the floating diffusion to a voltage signal corresponding to a quantity of the charge and outputs the converted signal,
a current source connected to a source of the source follower element,
a readout node which is formed by a connection part of the source of the source follower element and the current source and is connected to one input terminal of the comparator,
a coupling capacitor connected to the readout node of the output buffer part, and
a switch element connected between the coupling capacitor and the first input terminal of the comparator.

11. The solid-state imaging device according to claim 7, wherein:
at an output side of the comparator, a plurality of memory parts are connected in parallel corresponding to the sharing pixels.

12. The solid-state imaging device according to claim 1, wherein:
in the pixel part, the pixels are arranged in a matrix,
an output of the comparator is connected to a signal line laid in units of columns, and
the memory part is arranged in units of columns and is connected to the signal line.

13. The solid-state imaging device according to claim 12, wherein:
in the comparator,
a reset switch is connected between an output terminal and the first input terminal, and
a load capacitor is connected to the output terminal side.

14. The solid-state imaging device according to claim wherein:
the device has a stacked structure including
a first substrate and
a second substrate,
wherein the first substrate and the second substrate are connected through a connection part,
at least the photoelectric conversion element, the transfer element, the output node, and the output buffer part in the pixel are formed on the first substrate, and at least the comparator, the memory part, and at least a portion of the reading part are formed on the second substrate.

15. A method for driving a solid-state imaging device having
a pixel part in which pixels for performing photoelectric conversion are arranged and
a reading part which reads out pixel signals from the pixel part, wherein
each pixel includes
a photoelectric conversion element which accumulates a charge generated by photoelectric conversion in an integration period,
a transfer element capable of transferring the charge accumulated in the photoelectric conversion element in a transfer period after the integration period,
an output node to which the charge accumulated in the photoelectric conversion element is transferred through the transfer element,
a storage element connected to the output node,
a storage capacity element which accumulates the charge at the output node through the storage element,
a reset element which resets the output node to a predetermined potential in a reset period,
an output buffer part which converts the charge at the output node to a voltage signal with a gain corresponding to a quantity of the charge and outputs the converted voltage signal,
a comparator which performs an analog-to-digital (AD) conversion processing for comparing the voltage signal of the output buffer part and a reference voltage and outputting a digitalized comparison result signal, and
a memory part for storing data corresponding to the comparison result signal of the comparator,
the method for driving a solid-state imaging device comprising
under control of the reading part,
in a first reset period, performing a first conversion gain reset readout processing for reading from the output buffer part a first readout reset signal converted with a first conversion gain corresponding to a first charge amount of the output node and performing the AD conversion processing with respect to the first readout reset signal in the comparator,
in a readout period subsequent to the transfer period after the first reset period, performing a first conversion gain signal readout processing for reading from the output buffer part the first readout signal converted with the first conversion gain corresponding to the first charge amount of the output node and performing the AD conversion processing with respect to the first readout signal in the comparator and
performing a second conversion gain signal readout processing for reading, from the output buffer part, a second readout signal converted with a second conversion gain corresponding to a second charge amount obtained by combining the charge of the storage capacity element with the charge at the output node and performing the AD conversion processing with respect to the second readout signal in the comparator, and,
in a second reset period, performing a second conversion gain reset readout processing for reading from the output buffer part a second readout reset signal converted with a second conversion gain corresponding to the second charge amount and performing the AD conversion processing with respect to the second readout reset signal in the comparator and
storing in the memory part the data output by the AD conversion processing of the comparator in the first conversion gain reset readout processing.

16. A method for driving a solid-state imaging device as set forth in claim 15, wherein:
in the pixel part, the pixels are arranged in a matrix,
under the control of the reading part,
in the first reset period, the reset elements in all pixels are held in a conductive state and the first conversion gain reset readout processing is executed, AD conversion codes with respect to the first readout reset signal are stored in the memory parts, then,
in the transfer period, the transfer elements in all pixels are held in the conductive state to transfer the charges accumulated in the photoelectric conversion elements to the output nodes to thereby execute the global shutter operation for accumulating the overflowed charges in the storage capacity elements, and
when reading each row,
the first conversion gain signal readout processing, the second conversion gain signal readout processing, and the second conversion gain reset readout processing are executed in this order.

17. A method for driving a solid-state imaging device as set forth in claim 16, wherein:
under the control of the reading part,
the first conversion gain signal readout processing is executed while holding the storage element in a non-conductive state and separating the charge of the output node and the charge of the storage capacity element,
the second conversion gain signal readout processing is executed while holding the storage element in the conductive state and combining the charge of the output node and the charge of the storage capacity element, and
the second conversion gain reset readout processing is executed while holding the reset element, and the storage element in the conductive state and clearing the charge at the output node and the charge of the storage capacity element.

18. A method for driving a solid-state imaging device as set forth in claim 16, wherein:
for a next frame, the AD conversion code with respect to the second readout reset signal according to the second conversion gain reset readout processing is stored in the memory part.

19. An electronic apparatus, comprising
a solid-state imaging device and
an optical system for forming a subject image in the solid-state imaging device, wherein
the solid-state imaging device has
a pixel part in which pixels for performing photoelectric conversion are arranged and
a reading part which reads out pixel signals from the pixel part,
each pixel includes
a photoelectric conversion element which accumulates a charge generated by photoelectric conversion in an integration period,
a transfer element capable of transferring the charge accumulated in the photoelectric conversion element in a transfer period after the integration period,
an output node to which the charge accumulated in the photoelectric conversion element is transferred through the transfer element, a storage element connected to the output node, a storage capacity element which accumulates the charge at the output node through the storage element, a reset element which resets the output node to a predetermined potential in a reset period, an output buffer part which converts the charge at the output node to a voltage signal with a gain corresponding to a quantity of the charge and outputs the converted voltage signal, a comparator which performs an analog-to-digital (AD) conversion processing for comparing the voltage signal of the output buffer part and a reference voltage and outputting a digitalized comparison result signal, and a memory part for storing data corresponding to the comparison result signal of the comparator, the reading part is capable of performing:

in a first reset period, a first conversion gain reset readout processing for reading from the output buffer part a first readout reset signal converted with a first conversion gain corresponding to a first charge amount of the output node and performing the AD conversion processing with respect to the first readout reset signal in the comparator;

in a readout period subsequent to the transfer period after the first reset period, a first conversion gain signal readout processing for reading from the output buffer part the first readout signal converted with the first conversion gain corresponding to the first charge amount of the output node and performing the AD conversion processing with respect to the first readout signal in the comparator;

a second conversion gain signal readout processing for reading, from the output buffer part, a second readout signal converted with a second conversion gain corresponding to a second charge amount obtained by combining the charge of the storage capacity element with the charge at the output node and performing the AD conversion processing with respect to the second readout signal in the comparator; and in a second reset period, a second conversion gain reset readout processing for reading from the output buffer part a second readout reset signal converted with a second conversion gain corresponding to the second charge amount and performing the AD conversion processing with respect to the second readout reset signal in the comparator, and stores in the memory part the data output by the AD conversion processing of the comparator in the first conversion gain reset readout processing.

* * * * *